United States Patent
Niwa et al.

(10) Patent No.: US 8,722,185 B2
(45) Date of Patent: May 13, 2014

(54) PRESSURE-SENSITIVE ADHESIVE SHEET FOR GLASS PLATES

(71) Applicant: Nitto Denko Corporation, Ibaraki (JP)

(72) Inventors: Masahito Niwa, Ibaraki (JP); Kaori Miki, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/728,129

(22) Filed: Dec. 27, 2012

(65) Prior Publication Data

US 2013/0165610 A1 Jun. 27, 2013

(30) Foreign Application Priority Data

Dec. 27, 2011 (JP) .................. 2011-286832

(51) Int. Cl.
- C09J 157/10 (2006.01)
- C09J 157/12 (2006.01)
- C09J 133/08 (2006.01)
- C09J 133/10 (2006.01)
- C09J 133/14 (2006.01)

(52) U.S. Cl.
USPC ............ 428/355 AC; 526/264; 524/556

(58) Field of Classification Search
USPC ............ 526/264; 428/355 AC; 524/556
See application file for complete search history.

(56) References Cited

U.S. PATENT DOCUMENTS

| 2010/0075129 | A1 | 3/2010 | Nagasaki et al. | |
|---|---|---|---|---|
| 2010/0215947 | A1* | 8/2010 | Yamanaka et al. | 428/323 |
| 2010/0288431 | A1* | 11/2010 | Bossaert et al. | 156/247 |
| 2012/0121900 | A1 | 5/2012 | Niwa et al. | |

FOREIGN PATENT DOCUMENTS

| JP | 2008-120903 A | 5/2008 |
|---|---|---|
| JP | 2009-120807 A | 6/2009 |
| JP | 2012-117040 A | 6/2012 |

* cited by examiner

*Primary Examiner* — Ling Choi
*Assistant Examiner* — David L Miller
(74) *Attorney, Agent, or Firm* — Sughrue Mion, PLLC

(57) ABSTRACT

The present invention provides a pressure-sensitive adhesive sheet large in adhesive force when used for a surface of a glass member and capable of reducing the adhesive force to a degree allowing the occurrence of the cracking or breakage of the glass member to be suppressed when the sheet is peeled from the surface of the glass member. The pressure-sensitive adhesive sheet for glass plates of the present invention includes a pressure-sensitive adhesive layer including an acrylic polymer, wherein the content of the acrylic polymer in the pressure-sensitive adhesive layer is 30% by weight or more in relation to the total amount (100% by weight) of the pressure-sensitive adhesive layer; the acrylic polymer substantially includes no acidic functional group; the solvent-insoluble fraction of the pressure-sensitive adhesive layer is 50% or more; and the adhesive force to glass as determined by a specific method is 12.0 N or less.

9 Claims, 2 Drawing Sheets

PRESSURE-SENSITIVE ADHESIVE SHEET FOR GLASS PLATES

CROSS REFERENCE TO RELATED APPLICATIONS

This application claims priority from Japanese Patent Application No. 2011-286832 filed Dec. 27, 2011, the contents of all of which are incorporated herein by reference in their entirety.

TECHNICAL FIELD

The present invention relates to a pressure-sensitive adhesive sheet for glass plates. More specifically, the present invention relates to a pressure-sensitive adhesive sheet for glass plates, to be preferably used for glass plate fixing in image display sections in electronic devices.

BACKGROUND ART

Pressure-sensitive adhesive tapes are used for fixing top glass (glass members) of the image display sections (such as liquid crystal and El elements) of electronic devices such as cell phones, smartphones, tablet type PCs (tablet computers) and personal digital assistances (PDAs). The pressure-sensitive adhesive tape used in this application is demanded to have easiness in peeling (to be easily peeled) as well as strong adhesiveness. This is because there are a case where a top glass member is detached (reworked) because of a failure during the production process of an electronic device, or a case where an image display section is recovered to be reused (recycled) after a certain period of elapsed time.

As a pressure-sensitive adhesive sheet provided with adhesiveness and separability, heat foaming acrylic pressure-sensitive adhesive tapes are known (see, Patent Literature 1 and Patent Literature 2).

CITATION LIST

Patent Literature

Patent Literature 1: Japanese Patent Application Laid-Open No. 2008-120903
Patent Literature 2: Japanese Patent Application Laid-Open No. 2009-120807

SUMMARY OF INVENTION

Technical Problem

The pressure-sensitive adhesive sheet used for fixing the top glass member in the image display section of an electronic device is more required to suppress the cracking of the top glass member or the breakage of the image display section when the fixed portion is peeled.

In particular, in the production of a tablet type PC, the material cost is increasing with the increase of the size of the screen, and hence the recycle of the materials including glass has been strongly demanded. However, with the increase of the size of the screen, the used area of the pressure-sensitive adhesive sheet is increasing, and hence the peeling is becoming difficult.

Accordingly, an object of the present invention is to provide a pressure-sensitive adhesive sheet large in adhesive force when used for a surface of a glass member and capable of reducing the adhesive force to a degree allowing the occurrence of the cracking or breakage of the glass member to be suppressed when the sheet is peeled from the surface of the glass member.

Solution to Problem

The present inventors made a diligent study in order to achieve the aforementioned object, and consequently have perfected the present invention by discovering that when a pressure-sensitive adhesive sheet includes an acrylic polymer-containing pressure-sensitive adhesive layer, the content of the acrylic polymer in the pressure-sensitive adhesive layer is 30% by weight or more in relation to the total amount (100% by weight) of the pressure-sensitive adhesive layer, the acrylic polymer substantially includes no acidic functional group, the solvent-insoluble fraction of the pressure-sensitive adhesive layer is 50% or more, and the adhesive force to glass of the pressure-sensitive adhesive sheet as determined by a specific measurement method is 12.0 N or less, the pressure-sensitive adhesive sheet exhibits a large adhesive force when used to a surface of a glass member, and allows the adhesive force to be reduced to such a degree that leads to no occurrence of the cracking or breakage of the glass member when the pressure-sensitive adhesive sheet is peeled from the surface of the glass member.

Specifically, the present invention provides a pressure-sensitive adhesive sheet for glass plates, including an acrylic polymer-containing pressure-sensitive adhesive layer, wherein: the content of the acrylic polymer in the pressure-sensitive adhesive layer is 30% by weight or more in relation to the total amount (100% by weight) of the pressure-sensitive adhesive layer; the acrylic polymer substantially includes no acidic functional group; the solvent-insoluble fraction of the pressure-sensitive adhesive layer is 50% or more; and the adhesive force to glass of the pressure-sensitive adhesive sheet as determined by the following measurement method is 12.0 N or less.

[Measurement Method of Adhesive Force to Glass]

By using a pressure-sensitive adhesive sheet (width: 26 mm, length: 40 mm), a glass plate A (width: 50 mm, length: 100 mm, thickness: 0.7 mm) and a glass plate B (width: 26 mm, length: 760 mm, thickness: 1.0 mm) are laminated on each other to yield a laminate in such a way that: the size of the adhesion portion is 26 mm in width and 40 mm in length; the lengthwise direction of the pressure-sensitive adhesive sheet, the lengthwise direction of the glass plate A and the lengthwise direction of the glass plate B are the same as each other; and one lengthwise end A (adhesion end A) and one lengthwise end of the glass plate B are superposed to each other. The resulting laminate is allowed to stand in an atmosphere of 23° C. for 30 minutes, and then autoclave treated under the conditions of a pressure of 5 atm, a temperature of 50° C. and a time of period of 15 minutes. Then, the laminate after the autoclave treatment is heat treated under the conditions of a temperature of 145° C. and a period of time of 4 minutes. Then, the laminate after the heat treatment is allowed to stand in an atmosphere of 23° C. for 30 minutes, successively the portion of the glass plate B located at a distance displaced by 20 mm in the lengthwise direction from the end B (the adhesion end B) opposite to the end A in the pressure-sensitive adhesive sheet and not brought into contact with the pressure-sensitive adhesive sheet is pulled at a tensile rate of 300 mm/min in the thickness direction of the laminate toward the side of the glass plate B, and the force (N) required to peel the glass plate B is determined. The force required for the peeling is defined as the adhesive force to glass.

The pressure-sensitive adhesive sheet for glass plates preferably has an initial adhesive force of 3.0 N/20 mm or more as determined by the following measurement method.

[Measurement Method of Initial Adhesive Force]

In an atmosphere of 23° C., the pressure-sensitive adhesive sheet is laminated to a glass plate by pressing under the condition of a single back and forth movement of a 2-kg roller and is allowed to stand in the atmosphere of 23° C. for 30 minutes. After being allowed to stand, the pressure-sensitive adhesive sheet is peeled from the glass plate under the conditions of a peeling rate of 300 mm/min and a peeling direction of 180° to determine the 180° peeling adhesive strength (N/20 mm). The resulting 180° peeling adhesive strength is defined as the initial adhesive force.

The pressure-sensitive adhesive layer is preferably formed of a pressure-sensitive adhesive composition including a monomer mixture including the following (a1), and additionally at least one monomer selected from the group consisting of the following (a2) and (a3), or a partially polymerized substance of the monomer mixture, and including a heat-expandable micro particle, wherein the contents of (a1), (a2) and (a3), in the total amount (100% by weight) of (a1), (a2) and (a3), are 40 to 90% by weight, 0 to 40% by weight and 0 to 30% by weight, respectively:

(a1): An alkyl(meth)acrylate having an alkyl group having 4 to 12 carbon atoms, and giving a glass transition temperature of lower than 0° C. when polymerized into a homopolymer (a2): A monomer having in the molecule thereof at least a nitrogen atom and an ethylenically unsaturated bond (a3): A monomer (exclusive of the (a2)) giving a glass transition temperature of 0° C. or higher when polymerized into a homopolymer and having an ethylenically unsaturated bond in the molecule thereof The content of the heat-expandable micro particle in the pressure-sensitive adhesive composition is preferably 10 to 200 parts by weight in relation to 100 parts by weight of the monomer mixture.

The (a2) is preferably at least a monomer selected from a group consisting of dimethyl acrylamide, N-vinylpyrrolidone and N-vinyl caprolactam.

The (a3) has is preferably a (meth)acrylate monomer which gives a glass transition temperature of 0° C. or higher when polymerized into a homopolymer and has a structure in which a (meth)acryloyloxy group and a tertiary carbon atom are bonded to each other, or a (meth)acrylate monomer which gives a glass transition temperature of 0° C. or higher when polymerized into a homopolymer and has a structure in which a (meth)acryloyloxy group and a carbon atom forming a ring of a monocyclic or polycyclic alicyclic hydrocarbon are bonded to each other.

The (a3) is preferably at least a monomer selected from the group consisting of tert-butyl(meth)acrylate, cyclohexyl (meth)acrylate, isobornyl(meth)acrylate, 1,4-cyclohexanedimethanol mono(meth)acrylate and dicyclopentanyl (meth)acrylate.

The pressure-sensitive adhesive sheet for glass plates preferably has the pressure-sensitive adhesive layer at least one side of the backing film thereof.

The backing film is preferably a heat shrink film to shrink at a temperature in a range from 70 to 180° C. by 5% or more.

Advantageous Effects of Invention

The pressure-sensitive adhesive sheet for glass plates of the present invention is large in adhesive force when used for a surface of a glass member and capable of reducing the adhesive force to a degree allowing the occurrence of the cracking or breakage of the glass member to be suppressed when the sheet is peeled from the surface of the glass member.

DESCRIPTION OF EMBODIMENTS

Figure 1:
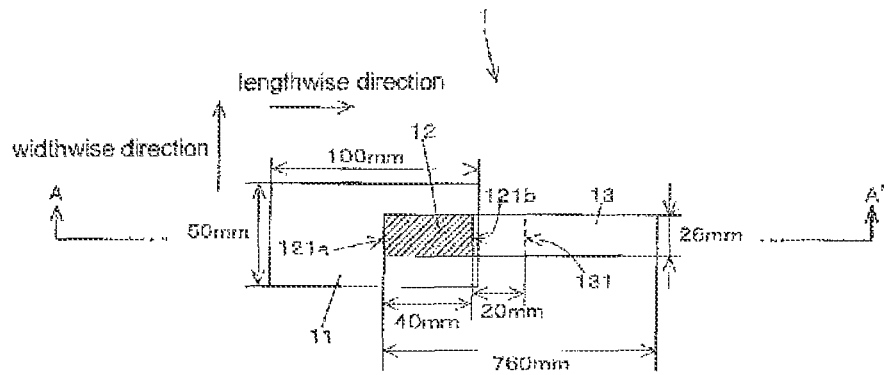
FIG. 1 is a schematic top plan view illustrating a laminate to be used at the time of measuring the adhesive force to glass.

The pressure-sensitive adhesive sheet for glass plates of the present invention includes at least one pressure-sensitive adhesive layer including an acrylic polymer. In present Description, the pressure-sensitive adhesive layer including an acrylic polymer is sometimes referred to as the "acrylic pressure-sensitive adhesive layer."

The form of the pressure-sensitive adhesive sheet for glass plates of the present invention is not particularly limited, but may be a form of being wound in a roll-like shape or a form in which sheets are laminated. In other words, the pressure-sensitive adhesive sheet for glass plates of the present invention is allowed to have a form such as a sheet shape or a tape shape. The pressure-sensitive adhesive sheet for glass plates of the present invention may be a type having no backing film (backing film layer), namely, a so-called backing film-less pressure-sensitive adhesive sheet or a type having a backing film, namely, a so-called backing film-including pressure-sensitive adhesive sheet.

A pressure-sensitive adhesive sheet wound in a roll-like shape may have a form in which the pressure-sensitive adhesive sheet is wound in a roll-like shape under the condition that the pressure-sensitive surface is protected with the below-described release film. Alternatively, when the pressure-sensitive adhesive sheet is a backing film-including pressure-sensitive adhesive sheet having a pressure-sensitive adhesive layer on one side of the backing film (the backing film for the pressure-sensitive adhesive sheet), the pressure-sensitive adhesive sheet having a form of being wound in a roll-like shape may have a form of being wound in a roll-like shape under the condition that the pressure-sensitive adhesive surface is protected with the release treated layer (back-side treated layer) formed on one side of the liner (the liner for the release film). The release treatment agent (release agent) used when the release treated layer is formed on one side of the liner (the liner for the release film) is not particularly limited; however, examples of the release treatment agent include a silicone-based release agent and a long-chain alkyl-based release agent.

The pressure-sensitive adhesive sheet for glass plates of the present invention may be a double-sided pressure-sensitive adhesive sheet in which both sides of the pressure-sensitive adhesive sheet are each a pressure-sensitive adhesive surface (a pressure-sensitive adhesive layer surface), or a single-sided pressure-sensitive adhesive sheet in which only one side of the pressure-sensitive adhesive sheet is a pressure-sensitive adhesive surface. The pressure-sensitive adhesive sheet for glass plates of the present invention present is preferably a double-sided pressure-sensitive adhesive sheet from the viewpoint of mutually laminating two members.

(Acrylic Pressure-Sensitive Adhesive Layer)

The acrylic pressure-sensitive adhesive layer is formed of an acrylic pressure-sensitive adhesive composition. It is to be noted that "the pressure-sensitive adhesive composition" is construed to include the meaning of "a composition for forming the pressure-sensitive adhesive." When the pressure-sensitive adhesive sheet for glass plates of the present invention includes two acrylic pressure-sensitive adhesive layers, the compositions and the thicknesses of the two acrylic pressure-sensitive adhesive layers may be the same as each other or different from each other.

The acrylic pressure-sensitive adhesive layer is a pressure-sensitive adhesive layer including an acrylic polymer as a main component. The content of the acrylic polymer in the acrylic pressure-sensitive adhesive layer is 30% by weight or more (for example, 30 to 100% by weight), preferably 50% by weight or more (for example, 50 to 100% by weight) and more preferably 60% by weight or more (for example, 60 to 100% by weight) in relation to the total amount (100% by weight) of the acrylic pressure-sensitive adhesive layer.

The pressure-sensitive adhesive in the acrylic pressure-sensitive adhesive layer may be a pressure-sensitive adhesive having any form; examples of the form of the pressure-sensitive adhesive include an emulsion-type pressure-sensitive adhesive, a solvent-type pressure-sensitive adhesive, a heat melt-type pressure-sensitive adhesive (hot melt-type pressure-sensitive adhesive) and an active energy ray curable-type pressure-sensitive adhesive.

Accordingly, the acrylic pressure-sensitive adhesive composition is different depending on the formation method of the pressure-sensitive adhesive layer and is not particularly limited; however, examples of the acrylic pressure-sensitive adhesive composition include: an acrylic pressure-sensitive adhesive composition including an acrylic polymer as an essential component; and an acrylic pressure-sensitive adhesive composition including as an essential component a mixture (sometimes referred to as a "monomer mixture") of the monomer components to form the acrylic polymer or a partially polymerized substance of the mixture. Examples of the former include, without being particularly limited to, a so-called solvent-type pressure-sensitive adhesive composition; and examples of the latter include, without being particularly limited to, a so-called active energy ray curable-type pressure-sensitive adhesive composition. The acrylic pressure-sensitive adhesive composition may include other additives in addition to the essential component (an acrylic polymer, or a monomer mixture or a partially polymerized substance of the monomer mixture).

The "monomer mixture" means a mixture included only of the monomer components to form the acrylic polymer. The "partially polymerized substance" means a composition In which one or two or more of the constituents of the monomer mixture are partially polymerized.

Above all, the acrylic pressure-sensitive adhesive composition is preferably the acrylic pressure-sensitive adhesive composition (the active energy ray curable-type pressure-sensitive adhesive composition) including as the essential component a monomer mixture or a partially polymerized substance of the monomer mixture.

The acrylic polymer included as a main component in the acrylic pressure-sensitive adhesive layer is constituted by using, as an essential monomer component, an alkyl(meth)acrylate having a linear or branched alkyl group. For the acrylic polymer, a copolymerizable monomer may also be used as a monomer component, together with the alkyl(meth)acrylate having a linear or branched alkyl group. Such alkyl(meth)acrylates each having a linear or branched alkyl group may be used each alone or in combinations of two or more thereof. Additionally, such copolymerizable monomers may be used each alone or in combinations of two or more thereof. In present Description, (meth)acrylic acid means "acrylic acid" and/or "methacrylic acid," and the same applies to other related terms.

The acrylic polymer substantially includes no acidic functional group. The acidic functional group means a functional group having an active hydrogen. Examples of the acidic functional group include a carboxyl group, a sulfonic acid group, a phosphoric acid group and a hydroxyl group. If the acrylic polymer includes an acidic functional group, an interaction between the acidic functional group and a glass plate or a surface of a glass member occurs, and consequently the adhesive force is increased with time, and hence the adhesive force is sometimes not allowed to be reduced to such a degree that leads to no occurrence of the cracking or breakage of the glass plate or the glass member when the pressure-sensitive adhesive sheet is peeled from the surface of the glass plate or the glass member.

For the purpose of allowing the acrylic polymer to substantially include no acidic functional group, preferably no monomers each having an acidic functional group are substantially included as the monomer components constituting the acrylic polymer.

In other words, preferably the acrylic polymer substantially includes as the constituent monomers no monomers each having an acidic functional group. "No substantial inclusion" means that no active mixing is performed except for inevitable mixing. Specifically, no substantial inclusion means that the content of the monomer having an acidic functional group in the total amount (100% by weight) of the monomers constituting the acrylic polymer is less than 1% by weight and preferably 0.5% by weight or less.

Examples of the monomer having an acidic functional group include a carboxyl group-containing monomer, a sulfonic acid group-containing monomer, a phosphoric acid group-containing monomer and a hydroxyl group-containing monomer. Examples of the carboxyl group-containing monomer include acrylic acid, methacrylic acid, carboxyethyl acrylate, carboxypentyl acrylate, itaconic acid, maleic acid, fumaric acid and crotonic acid. Examples of the carboxyl group-containing monomer also include acid anhydride monomers such as maleic anhydride and itaconic anhydride. Examples of the hydroxyl group-containing monomer include 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate and (4-hydroxymethylcyclohexyl)-methyl acrylate. Examples of the sulfonic acid group-containing monomer include styrene sulfonic acid, allyl sulfonic acid, 2-(meth)acrylamide-2-methylpropanesulfonic acid, (meth)acrylamidopropanesulfonic acid, sulfopropyl(meth)acrylate and (meth)acryloyloxynaphthalenesulfonic acid. Examples of the phosphoric acid group-containing monomer include 2-hydroxyethylacryloyl phosphate.

For the purpose of allowing the acrylic polymer to substantially include no acidic functional group, the acrylic polymer is preferably constituted with the following (a1), as a monomer component, and additionally at least one monomer, as a monomer component, selected from the group consisting of the following (a2) and (a3). In other words, the acrylic polymer preferably include as the monomer constituent units the following (a1) and additionally at least one monomer selected form the group consisting of the following (a2) and (a3). Specifically, the acrylic pressure-sensitive adhesive layer is particularly preferably formed of an acrylic pressure-sensitive composition including a monomer mixture including the following (a1) and additionally one monomer selected from the group consisting of the following (a2) and (a3), or a partially polymerized substance of the monomer mixture.

(a1): An alkyl(meth)acrylate having an alkyl group having 4 to 12 carbon atoms, and giving a glass transition temperature of lower than 0° C. when polymerized into a homopolymer (a2): A monomer having in the molecule thereof at least a nitrogen atom and an ethylenically unsaturated bond (a3): A monomer (exclusive of the (a2)) giving a glass transition temperature of 0° C. or higher when polymerized into a homopolymer and having an ethylenically unsaturated bond in the molecule thereof.

In present Description, "the acrylic pressure-sensitive composition including the mixture including the (a1) and additionally one monomer selected from the group consisting of the (a2) and (a3), or the partially polymerized substance of the monomer mixture" is sometimes referred to as "the acrylic pressure-sensitive adhesive composition A."

The acrylic pressure-sensitive adhesive composition A includes the monomer mixture including the (a2) and/or the (a3), or a partially polymerized substance of the monomer mixture, and hence the acrylic pressure-sensitive adhesive layer formed of the acrylic pressure-sensitive adhesive composition A exhibits a high initial adhesive force and a high adhesion reliability (in particular, repulsion resistance) to a glass plate or a surface of a glass member. The (a2) and (a3) are included for the purpose of improving the adhesive force and the cohesive force of the pressure-sensitive adhesive layer.

In particular, the (a3) includes a component to enhance the effect of the (a2), and hence the acrylic pressure-sensitive adhesive composition A preferably includes the monomer mixture including the (a2) and (a3) or the partially polymerized substance of the monomer mixture.

The (a2) or the (a3) is not a monomer having a functional group causing interaction with a glass plate of a surface of a glass member, and hence the acrylic pressure-sensitive adhesive layer formed of the acrylic pressure-sensitive adhesive composition A hardly interacts with the glass plate or the surface of the glass member and is hardly increased in adhesive force with time. Consequently, also for the purpose of obtaining an intended adhesive force to glass, the acrylic pressure-sensitive adhesive composition A is preferable.

In present Description, "the glass transition temperature (Tg) when polymerized into a homopolymer" means the glass transition temperature (Tg) of the homopolymer of the concerned monomer," and means the glass transition temperature (Tg) of a polymer formed only of a monomer (sometimes referred to as a "monomer X") as the monomer component. Specifically, numerical values are presented in "Polymer Handbook" (3rd edition, John Wiley & Sons, Inc., 1989). The glass transition temperature (Tg) of a homopolymer not included in the foregoing literature means a value obtained by the following measurement method. Specifically, in a reactor equipped with a thermometer, a stirrer, a nitrogen introducing tube and a reflux condenser, 100 parts by weight of the monomer X, 0.2 parts by weight of 2,2'-azobisisobutyronitrile and 200 parts by weight of ethyl acetate as a polymerization solvent are placed, and the resulting mixture is stirred for 1 hour while nitrogen gas is being introduced. In this way, the oxygen in the polymerization system is removed, and then the mixture is increased in temperature to 63° C. and is allowed to react for 10 hours. Next, the mixture is cooled down to room temperature to yield a homopolymer solution having a solid content concentration of 33% by weight. Next, the homopolymer solution is applied by casting on a release liner and dried to prepare a 2-mm thick test sample (a sheet-shaped homopolymer). Then, about 1 to 2 mg of the test sample was weighed and placed in an aluminum open cell, and the reversing heat flow (specific heat component) behavior is determined by using a temperature modulation DSC (trade name: "Q-2000," manufactured by TA Instruments Inc.), in an nitrogen atmosphere of 50 ml/min, at a temperature increase rate of 5° C./rain. With reference to JIS-K-7121, the temperature at which a straight line equidistant from the straight lines extended from the low temperature-side baseline and the high temperature-side baseline of the obtained reversing heat flow and the curve of the step-like varying portion of the glass transition cross is defined as the glass transition temperature (Tg) when polymerized into the homopolymer.

In present Description, "the ethylenically unsaturated bond" means a radical polymerizable carbon-carbon double bond. The group having an ethylenically unsaturated bond is not particularly limited; however, examples of the group having an ethylenically unsaturated bond include a vinyl group, a vinylidene group, an allyl group and a (meth)acryloyl group. In present Description, "monofunctional" means that an ethylenically unsaturated bond is present in a molecule, and "multifunctional" means that two or more ethylenically unsaturated bonds are present in a molecule.

The (a1) is an alkyl(meth)acrylate monomer having an alkyl group having 4 to 12 carbon atoms, and giving a glass transition temperature of lower than 0° C. when polymerized into a homopolymer. The (a1) is a monomer having a (meth)acryloyl group in the molecule thereof, and a monomer having an ethylenically unsaturated bond in the molecule thereof. The (a1) is a so-called monofunctional monomer. In the monomer mixture included in the acrylic pressure-sensitive adhesive composition A, the (a1) is an essential monomer component.

Examples of the (a1) include the monomers listed in Table 1 presented below. The (a1) monomers may be used each alone or in combinations of two or more thereof.

TABLE 1

| (a1) | Glass transition temperature when polymerized into homopolymer [° C.] |
|---|---|
| n-Butyl acrylate | −54 |
| sec-Butyl acrylate | −22 |
| 1,3-Dimethylbutyl acrylate | −15 |
| 2-Ethylbutyl acrylate | −50 |
| 2-Ethylhexyl acrylate | −50 |
| 2-Ethylhexyl methacrylate | −10 |
| n-Octyl acrylate | −65 |
| n-Octyl methacrylate | −20 |
| n-Nonyl acrylate | −58 |
| Lauryl acrylate | −3 |
| Lauryl methacrylate | −65 |

Among these (a1) monomers, the (a1) is preferably an alkyl(meth)acrylate monomer having an alkyl group having 4 to 12 carbon atoms and giving a glass transition temperature of lower than −20° C. when polymerized into a homopolymer, and more preferably an alkyl(meth)acrylate monomer having an alkyl group having 4 to 12 carbon atoms and giving a glass transition temperature of lower than −40° C. when polymerized into a homopolymer.

Specifically, the (a1) is preferably n-butyl acrylate, sec-butyl acrylate, 2-ethylbutyl acrylate, 2-ethylhexyl acrylate, n-octyl acrylate, n-octyl methacrylate, n-nonyl acrylate, lauryl acrylate or lauryl methacrylate; and the (a1) is more preferably n-butyl acrylate or 2-ethylhexyl acrylate.

In the monomer mixture for the acrylic pressure-sensitive adhesive composition A, the content of (a1) in the total amount (100% by weight) of (a1), (a2) and (a3) is not particularly limited, but is preferably 40 to 90% by weight, more preferably 50 to 85% by weight and furthermore preferably 60 to 80% by weight. When the content of (a1) is 40% by weight or more, the adhesion property for a glass plate or a surface of a glass member in an environment of normal temperature (23±2° C.) or low temperatures (for example, −40 to −10° C.) is preferably more enhanced. On the other hand, when the content of (a1) is 90% by weight or less, preferably the degradations of the adhesive force, repulsion resistance and cohesive property due to the deficiencies of (a2) and (a3) are hardly caused.

If the acrylic pressure-sensitive adhesive composition A includes, instead of (a1), "a monomer mixture including an alkyl(meth)acrylate monomer having an alkyl group having 4 to 12 carbon atoms and giving a glass transition temperature exceeding 0° C. when polymerized into a homopolymer, or an partially polymerized substance of the monomer mixture," the initial adhesive force and the adhesion reliability of the formed pressure-sensitive adhesive layer tend to be degraded. If the acrylic pressure-sensitive adhesive composition A includes, instead of (a1), "a monomer mixture including an alkyl(meth)acrylate monomer having an alkyl group having 1 to 3 carbon atoms and giving a glass transition temperature exceeding 0° C. when polymerized into a homopolymer, or an partially polymerized substance of the monomer mixture," or if the acrylic pressure-sensitive adhesive composition A includes, instead of (a1), "a monomer mixture including an alkyl(meth)acrylate monomer having an alkyl group having more than 12 carbon atoms and giving a glass transition temperature exceeding 0° C. when polymerized into a homopolymer, or an partially polymerized substance of the monomer mixture," the initial adhesive force and the adhesion reliability of the formed pressure-sensitive adhesive layer tend to be degraded.

The (a2) is a monomer having in the molecule thereof at least a nitrogen atom and an ethylenically unsaturated bond. The (a2) has an ethylenically unsaturated bond in the molecule thereof, and hence is a monofunctional monomer. The (a2) is a copolymerizable component of the (a1). The (a2) monomers may be used each alone or in combinations of two or more thereof. In the monomer mixture included in the acrylic pressure-sensitive adhesive composition A, the (a2) is an optional monomer component.

The (a2) is not particularly limited, but is preferably a monomer selected from the group consisting of N-vinyl cyclic amides and (meth)acrylamides.

Examples of the N-vinyl cyclic amide include the compounds represented by the following formula (1):

[Formula 1]

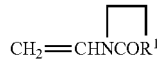

(1)

wherein in formula (1), $R^1$ represents a divalent organic group.

In formula (1), $R^1$ is preferably a saturated hydrocarbon group and more preferably an alkylene group having 3 to 5 carbon atoms or the like.

Examples of the N-vinyl cyclic amide include N-vinyl-2-pyrrolidone, N-vinyl-2-piperidone, N-vinyl-3-morpholinone, N-vinyl-2-caprolactam, N-vinyl-1,3-oxazin-2-one, N-vinyl-3,5-morpholinedione, N-vinylpyridine, N-vinylpyrimidine, N-vinylpiperazine and N-vinylpyrrole.

Examples of the (meth)acrylamides include (meth)acrylamide, N-alkyl(meth)acrylamide and N,N-dialkyl(meth)acrylamide. Examples of the N-alkyl(meth)acrylamide include N-ethyl(meth)acrylamide, N-n-butyl(meth)acrylamide and N-octylacrylamide. Examples of the N-alkyl(meth)acrylamide further include amino group-containing (meth)acrylamides such as dimethylaminoethyl(meth)acrylamide and diethylaminoethyl(meth)acrylamide. Next, Examples of the N,N-dialkyl(meth)acrylamide include N,N-dimethyl(meth)acrylamide, N,N-diethyl(meth)acrylamide, N,N-dipropyl(meth)acrylamide, N,N-diisopropyl(meth)acrylamide, N,N-di(n-butyl)(meth)acrylamide and N,N-di(t-butyl)(meth)acrylamide.

Examples of the (meth)acrylamides further include N-acryloyl group-containing cyclic(meth)acrylamides such as (meth)acryloyl morpholine, (meth)acryloylpyrrolidone and (meth)acryloylpyrrolidine.

Examples of the (meth)acrylamides further include N-hydroxyalkyl(meth)acrylamide monomers each having 1 to 4 carbon atoms. Examples of the N-hydroxyalkyl(meth)acrylamide monomers each having a hydroxyalkyl group having 1 to 4 carbon atoms include the compounds represented by the following formula (2):

[Formula 2]

$$CH_2=C(R^2)CONR^3R^4 \qquad (2)$$

wherein in formula (2), $R^2$ represents a hydrogen atom or a methyl group, $R^3$ represents a hydroxyalkyl group having 1 to 4 carbon atoms and $R^4$ represents a hydrogen atom or a saturated hydrocarbon group having 1 to 10 carbon atoms.

In formula (2), $R^3$ may have a linear chain structure or a branched chain structure.

Examples of the N-hydroxyalkyl(meth)acrylamide monomers each having a hydroxyalkyl group having 1 to 4 carbon atoms include: N-methylol(meth)acrylamide, N-(2-hydroxyethyl)acrylamide, N-(2-hydroxyethyl)methacrylamide, N-(2-hydroxypropyl)acrylamide, N-(2-hydroxypropyl)methacrylamide, N-(1-hydroxypropyl)acrylamide, N-(1-hydroxypropyl)methacrylamide, N-(3-hydroxypropyl)acrylamide, N-(3-hydroxypropyl)methacrylamide, N-(2-hydroxybutyl)acrylamide, N-(2-hydroxybutyl)methacrylamide, N-(3-hydroxybutyl)acrylamide, N-(3-hydroxybutyl)methacrylamide, N-(4-hydroxybutyl)acrylamide, N-(4-hydroxybutyl)methacrylamide and N-methyl-N-2-hydroxyethyl(meth)acrylamide.

Additionally, examples of the (a2) other than the N-vinyl cyclic amides and the (meth)acrylamides include: amino group-containing monomers such as aminoethyl(meth)acrylate, N,N-dimethylaminoethyl(meth)acrylate and N,N-diaminopropylmethyl(meth)acrylate; maleimide skeleton-containing monomers such as N-cyclohexyl maleimide and N-phenyl maleimide; itaconimide monomers such as N-methylitaconimide, N-ethylitaconimide, N-butylitaconimide, N-2-ethylhexylitaconimide, N-laurylitaconimide and N-cyclohexylitaconimide; cyanoacrylate monomers such as acrylonitrile and methacrylonitrile; and succinimide monomers such as N-(meth)acryloyloxymethylene succinimide, N-(meth)acryloyl-6-oxyhexamethylene succinimide and N-(meth)acryloyl-8-oxyoctamethylene succinimide.

From the viewpoint of the easiness in establishing a balance between the adhesion reliability and the flexibility in the acrylic pressure-sensitive adhesive layer, the following are preferable as the (a2): N-vinyl-2-pyrrolidone and N-vinyl-2-caprolactam; (meth)acrylamides having one or two N-alkyl groups having 1 to 4 (preferably 1 or 2) carbon atoms (for example, N,N-dialkylacrylamides such as N,N-diethylacrylamide and N,N-dimethylacrylamide); and N-(2-hydroxyethyl)acrylamide, N-(2-hydroxyethyl)methacrylamide, N-methylol(meth)acrylamide and N-(3-hydroxypropyl)acrylamide. In particular, the following are preferable as the (a2): N,N-dimethylacrylamide, N-vinyl-2-pyrrolidone, N-vinyl-2-caprolactam; and the following are most preferable as the (a2): N-vinyl-2-pyrrolidone and N-vinyl-2-caprolactam.

In the monomer mixture for the acrylic pressure-sensitive adhesive composition A, the content of the (a2) in the total amount (100% by weight) of the (a1), (a2) and (a3) is not particularly limited, but is preferably 0 to 40% by weight.

In particular, in the monomer mixture for the acrylic pressure-sensitive adhesive composition A, when the (a2) is included together with the (a1), the content of the (a2) in the total amount (100% by weight) of the (a1), (a2) and (a3) is not particularly limited, but is preferably 5 to 40% by weight, more preferably 5 to 35% by weight and furthermore preferably 10 to 30% by weight. When the content of the (a2) is 5% by weight or more, preferably the improvement of the workability of the pressure-sensitive adhesive sheet is facilitated. When the content of the (a2) is 40% by weight or less, preferably the degradation of the flexibility or the degradation of the tackiness can be effectively suppressed. The degradation of the flexibility possibly leads to the degradation of the adhesion reliability (in particular, the repulsion resistance).

The (a3) is a monomer giving a glass transition temperature of 0° C. or higher when polymerized into a homopolymer and having an ethylenically unsaturated bond in the molecule thereof. In the (a3), the (a2) is not included. The (a3) has an ethylenically unsaturated bond in the molecule thereof, and hence is a monofunctional monomer. The (a3) monomers may be used each alone or in combinations of two or more thereof. In the monomer mixture included in the acrylic pressure-sensitive adhesive composition A, the (a2) is an optional monomer component.

Examples of the (a3) include the monomers listed in Table 2 presented below.

TABLE 2

| (a3) | Glass transition temperature when polymerized into homopolymer [° C.] |
|---|---|
| tert-Butyl acrylate | 43 |
| tert-Butyl methacrylate | 118 |
| Cyclohexyl acrylate | 19 |
| Cyclohexyl methacrylate | 83 |
| Isobornyl acrylate | 94 |
| Isobornyl methacrylate | 110 |
| Furfuryl acrylate | 48 |
| Dicyclopentanyl acrylate | 120 |
| 1,4-Cyclohexanedimethanol monoacrylate | 9.8 |
| Dicyclopentenyloxyethyl acrylate | 10-15 |

Above all, the (a3) is preferably a monomer (exclusive of the (a2)) giving a glass transition temperature of 10° C. or higher when polymerized into a polymer and having an ethylenically unsaturated bond in the molecule thereof, and more preferably a monomer (exclusive of the (a2)) giving a glass transition temperature of 15° C. or higher when polymerized into a polymer and having an ethylenically unsaturated bond in the molecule thereof.

The (a3) is also preferably "a (meth)acrylate monomer which gives a glass transition temperature of 0° C. or higher when polymerized into a homopolymer and has a structure in which a (meth)acryloyloxy group and a tertiary carbon atom are bonded to each other, or a (meth)acrylate monomer which gives a glass transition temperature of 0° C. or higher when polymerized into a homopolymer and has a structure in which a (meth)acryloyloxy group and a carbon atom forming a ring of a monocyclic or polycyclic alicyclic hydrocarbon are bonded to each other, because these monomers each have no structure (for example, an acidic group) in the molecule thereof causing an interaction with an adherend and regulates the elasticity and the flexibility of the pressure-sensitive adhesive layer formed of the pressure-sensitive adhesive composition.

Specifically, as the (a3), tert-butyl acrylate, tert-butyl methacrylate, cyclohexyl acrylate, cyclohexyl methacrylate, isobronyl acrylate, isobornyl methacrylate, dicyclopentanyl acrylate, furfuryl acrylate and 1,4-cyclohexanedimethanol monoacrylate are preferable; and as the (a3), tert-butyl acrylate, cyclohexyl acrylate, isobronyl acrylate, dicyclopentanyl acrylate and 1,4-cyclohexanedimethanol monoacrylate are more preferable from the viewpoint of polymerizability. Additionally, isobronyl acrylate, isobornyl methacrylate and dicyclopentanyl acrylate are particularly preferable because these monomers lead to high Tg values.

In the monomer mixture for the acrylic pressure-sensitive adhesive composition A, the content of the (a3) in the total amount (100% by weight) of the (a1), (a2) and (a3) is not particularly limited, but is preferably 0 to 30% by weight.

In particular, when the (a3) is included together with the (a1) in the monomer mixture for the acrylic pressure-sensitive adhesive composition A, the content of the (a3) in the total amount (100% by weight) of the (a1), (a2) and (a3) is not particularly limited, but is preferably 5 to 30% by weight, more preferably 5 to 25% by weight and furthermore preferably 5 to 20% by weight. When the content of the (a3) is 5% by weight or more, preferably better adhesion reliability is obtained. When the content of the (a3) is 30% by weight or less, preferably better flexibility is obtained. The degradation of the flexibility possibly leads to the degradation of the adhesion reliability (in particular, repulsion resistance).

The monomer mixture for the acrylic pressure-sensitive adhesive composition A may include a copolymerizable monomer (a4) together with the (a1), (a2) and/or (a3) within a range not impairing the advantageous effects of the present invention. The (a4) does not include the (a1), (a2) and (3), and the below described multifunctional monomer. The (a4) is a monofunctional monomer having an ethylenically unsaturated bond in the molecule thereof. The (a4) monomers may be used each alone or in combinations of two or more thereof. The content of the (a4) is not particularly limited, but is selected within a range not impairing the advantageous effects of the present invention.

For the purpose of obtaining good adhesion reliability (in particular, repulsion resistance) when laminated to a glass plate or a surface of a glass member, and for the purpose of regulating the below-described adhesive force to glass, in the monomer mixture for the acrylic pressure-sensitive adhesive composition A, the contents of the (a1), (a2) and (a3), in the total amount (100% by weight) of the (a1), (a2) and (a3), are preferably 40 to 90% by weight, 0 to 40% by weight and 0 to 30% by weight, respectively. In other words, the pressure-sensitive adhesive sheet for glass plates of the present invention particularly preferably includes an acrylic pressure-sensitive adhesive layer formed of the acrylic pressure-sensitive adhesive composition A including a monomer mixture including the (a1) and additionally at least one monomer selected from the group consisting of the (a2) and (a3) or a partially polymerized substance of the monomer mixture, wherein in the monomer mixture, the contents of the (a1), (a2) and (a3), in the total amount (100% by weight) of the (a1), (a2) and (a3), are preferably 40 to 90% by weight, 0 to 40% by weight and 0 to 30% by weight, respectively.

The acrylic pressure-sensitive adhesive composition A preferably includes, together with the monomer mixture or the partially polymerized substance of the monomer mixture, a heat-expandable micro particle. In other words, the acrylic pressure-sensitive adhesive composition A is preferably a heat-expandable micro particle-containing pressure-sensitive adhesive composition.

In other words, the acrylic pressure-sensitive adhesive layer is particularly preferably formed of the heat-expandable micro particle-containing acrylic pressure-sensitive adhesive composition A including the monomer mixture including the (a1) and additionally at least one monomer selected from the group consisting of the (a2) and (a3) or the partially polymerized substance of the monomer mixture, and the heat-expandable micro particle wherein the contents of the (a1), (a2) and (a3), in the total amount (100% by weight) of the (a1), (a2) and (a3), are 40 to 90% by weight, 0 to 40% by weight and 0 to 30% by weight, respectively.

The heat-expandable micro particle means a micro particle the volume of which expands due to heat. Two or more types of heat-expandable micro particles may be used each alone or in combinations of two or more types thereof.

In the case where the acrylic pressure-sensitive adhesive composition A includes a heat-expandable micro particle, when the acrylic pressure-sensitive adhesive layer formed of the acrylic pressure-sensitive adhesive composition A is laminated to an adherend such as a glass plate or a surface of a glass member and then heated, the reduction of the contact area between the pressure-sensitive adhesive layer and the adherend is caused by the foaming due to heating of the heat-expandable micro particle, (i) a property (separability, easy peelability) of easily degrading adhesive force and (ii) the debondability (delamination property) of the bond portion are exhibited. In present Description of the present application, the properties of (i) and (ii) are sometimes collectively referred to as the "separability/debondability."

The heat-expandable micro particle is not particularly limited, but is preferably a microencapsulated heat-expandable micro particle. Examples of such a microencapsulated heat-expandable micro particle include microspheres (sometimes referred to as "heat-expandable microspheres") prepared by encapsulating substances easily gasified and expanding by heating such as isobutane, propane and pentane in elastic shells.

The shells of the heat-expandable microspheres are preferably formed of a thermoplastic substance, a heat-melt substance or a substance to burst by thermal expansion. Examples of the substances to form the shells of the heat-expandable microspheres include vinylidene chloride-acrylonitrile copolymer, polyvinyl alcohol, polyvinyl butyral, polymethylmethacrylate, polyacrylonitrile, vinylidene chloride and polysulfone. The heat-expandable microspheres are produced by conventional methods such as a coacervation method and an interface polymerization method.

As the heat-expandable microspheres, commercially available products are quoted. Examples of the commercially available products of the heat-expandable microspheres include: "Matsumoto Microsphere F-30," "Matsumoto Microsphere F-50," "Matsumoto Microsphere F-80S" and "Matsumoto Microsphere F-85" (trade names, manufactured by Matsumoto Yushi-Seiyaku Co., Ltd.); and "Expancel Du Series" (trade name, manufactured by Expancel, Inc.). Among these, "Expancel 051 Du 40" (trade name, manufactured by Expancel, Inc.) is preferable.

The average particle size of the heat-expandable micro particle is not particularly limited, but is preferably 1 to 80 μm and more preferably 3 to 50 μm from the viewpoint of the dispersibility and the thin layer formability.

From the viewpoint of efficiently causing the degradation of the adhesive force by heat treatment and regulating the below-described adhesive force to glass, the heat-expandable micro particle preferably has a strength such that no bursting occurs until the volume expansion ratio is five or more, in particular, ten or more. When a heat-expandable particle bursting at a low volume expansion ratio (for example, a heat-expandable particle bursting at a volume expansion ratio increased by a factor of less than five) or a non-microencapsulated thermal expansion agent (heat-foaming agent) is used, the degradation of the adhesive force by heat treatment cannot be efficiently caused, and thus the below-described adhesive force to glass sometimes cannot be obtained.

The volume expansion ratio is derived with the following formula:

volume expansion ratio=(volume of heat-expandable microsphere after heating)/(volume of heat-expandable microsphere before heating)

The content of the heat-expandable micro particle in the acrylic pressure-sensitive adhesive composition A is not particularly limited, but is preferably 10 to 200 parts by weight, more preferably 20 to 125 parts by weight, furthermore preferably 25 to 100 parts by weight and most preferably 25 to 80 parts by weight in relation to 100 parts by weight of the monomer mixture. When the content of the heat-expandable micro particle is 10 parts by weight or more, the degradation of the adhesive force by heat treatment can be efficiently caused, and thus the below-described adhesive force to glass can be easily regulated. When the content of the heat-expandable micro particle is 200 parts by weight or less, preferably the occurrence of the cohesion failure of the acrylic pressure-sensitive adhesive layer can be suppressed.

Additionally, the acrylic pressure-sensitive adhesive composition A preferably includes, together with the heat-expandable micro particle, a polymerization initiator such as a thermal polymerization initiator or a photopolymerization initiator. When the acrylic pressure-sensitive adhesive composition A includes a polymerization initiator, a curing reaction based on heat or an active energy ray can be effectively utilized at the time of forming the acrylic pressure-sensitive adhesive layer, and hence the acrylic pressure-sensitive adhesive layer can be easily obtained by curing the acrylic pressure-sensitive adhesive composition A in the form of including the heat-expandable micro particle being mixed therein. In other words, when the acrylic pressure-sensitive adhesive composition A includes a polymerization initiator, it is possible to easily obtain the acrylic pressure-sensitive adhesive layer in which the heat-expandable micro particle is stably included. In particular, the acrylic pressure-sensitive adhesive composition A preferably includes a photopolymerization initiator as described below, and hence by utilizing a polymerization reaction (photocuring reaction) using an active energy ray, it is possible to easily obtain the acrylic pressure-sensitive adhesive layer in which the heat-expandable micro particle is stably included. The polymerization initiators may be used each alone or in combinations of two or more thereof.

In particular, because the curing time at the time of forming the pressure-sensitive adhesive layer by using the pressure-sensitive adhesive composition can be reduced, the polymerization initiator is preferably a photopolymerization initiator. Examples of the active energy ray used for irradiation when the curing reaction based on an active energy ray is used include: ionizing radiation such as α-ray, β-ray, γ-ray, neutron ray or electron beam; and ultraviolet ray; among these, ultraviolet ray is preferable. The irradiation energy, the irradiation time and the like of the active energy ray are not particularly limited, but are appropriately selected within a range not inhibiting the polymerization reaction.

The photopolymerization initiator is not particularly limited; however, examples of the photopolymerization initiator include: benzoin ether-based photopolymerization initiators, acetophenone-based photopolymerization initiators, α-ketol-based photopolymerization initiators, aromatic sulfonyl chloride-based photopolymerization initiators, optically active oxime-based photopolymerization initiators, benzoin-based photopolymerization initiators, benzil-based photopolymerization initiators, benzophenone-based photopolymerization initiators, ketal-based photopolymerization initiators and thioxanthone-based photopolymerization initiators.

Specifically, examples of the ketal-based photopolymerization initiators include 2,2-dimethoxy-1,2-diphenylethan-1-one (trade name: "Irgacure 651," manufactured by BASF Japan Ltd.). Examples of the α-hydroxyketone-based photopolymerization initiators include 1-hydroxy-1-cyclohexyl-phenylketone (trade name: "Irgacure 184," manufactured by BASF Japan Ltd.), 2-hydroxy-2-methyl-1-phenyl-propan-1-one (trade name: "Dalocure 1173," manufactured by BASF Japan Ltd.) and 1-[4-(2-hydroxyethoxy)-phenyl]-2-hydroxy-2-methyl-1-propan-1-one (trade name: "Irgacure 2959," manufactured by BASF Japan Ltd.). Examples of the α-aminoketonephotopolymerization initiators include 2-methyl-1-[4-(methylthiophenyl]-2-morpholinopropan-1one (trade name: "Irgacure 907," manufactured by BASF Japan Ltd.) and 2-benzyl-2-dimethylamino-1-(morpholinophenyl)-butanone-1 (trade name: "Irgacure 369," manufactured by BASF Japan Ltd.). Examples of the acylphosphine oxide-based photopolymerization initiators include 2,4,6-trimethylbenzoyl diphenylphosphine oxide (trade name: "Lucilin TPO," manufactured by BASF Japan Ltd.). Examples of the benzoin ether-based photopolymerization initiators include benzoin methyl ether, benzoin ethyl ether, benzoin propyl ether, benzoin isopropyl ether, benzoin isobutyl ether, 2,2-dimethoxy-1,2-diphenylethan-1-one and anisole methyl ether. Examples of the acetophenone-based photopolymerization initiators include 2,2-diethoxyacetophenone, 2,2-dimethoxy-2-phenylacetophenone, 1-hydroxycyclohexyl phenyl ketone, 4-phenoxydichloroacetophenone and 4-t-butyl-dichloroacetophenone. Examples of the aromatic sulfonyl chloride-based photopolymerization initiators include 2-naphthalenesulfonyl chloride. Examples of the optically active oxime-based photopolymerization initiators include 1-phenyl-1,1-propanedione-2-(o-ethoxycarbonyl)-oxime. Examples of the benzoin-based photopolymerization initiators include benzoin. Examples of the benzil-based photopolymerization initiators include benzil. Examples of the benzophenone-based photopolymerization initiators include benzophenone, benzoylbenzoic acid, 3,3'-dimethyl-4-methoxybenzophenone, polyvinyl benzophenone and α-hydroxycyclohexyl phenyl ketone. Examples of the ketal-based photopolymerization initiators include benzil methyl ketal. Examples of the thioxanthone-based photopolymerization initiators include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone and docedylthioxanthone.

The content of the polymerization initiator in the acrylic pressure-sensitive adhesive composition A is different depending on the type of the polymerization initiator and is not particularly limited, when the polymerization initiator is the photopolymerization initiator, but is preferably 0.001 to 5 parts by weight, more preferably 0.01 to 5 parts by weight and furthermore preferably 0.05 to 3 parts by weight in relation to 100 parts by weight of the monomer mixture. When the content of the photopolymerization initiator is 0.001 part by weight or more, preferably it is possible to suppress the extension of the time required for the polymerization reaction. When the content of the photopolymerization initiator is 5 parts by weight or less, preferably it is possible to suppress the decrease of the molecular weight of the acrylic polymer included in the acrylic pressure-sensitive adhesive layer and to suppress the variation of the pressure-sensitive property.

Additionally, the acrylic pressure-sensitive adhesive composition preferably includes a monomer having two or more ethylenically unsaturated bonds in the molecule thereof, for the purpose of regulating the elasticity or the flexibility of the acrylic pressure-sensitive adhesive layer, and moreover, for the purpose of improving the adhesive force by increasing the cohesive force of the acrylic pressure-sensitive adhesive layer. Also, from the viewpoint of enabling efficient occurrence of the degradation of the adhesive force caused by the foaming of the heat-expandable micro particle due to heat treatment and enabling easy regulation of the below described adhesive force to glass, it is preferable to include a monomer having two or more ethylenically unsaturated bonds in the molecule thereof. In present Description, "the monomer having two or more ethylenically unsaturated bonds in the molecule thereof" is sometimes referred to as "the multifunctional monomer." In the multifunctional monomer, the (a2) and the (a3) are not included. The multifunctional monomers may be used each alone or in combinations of two or more thereof.

The multifunctional monomer is preferably a monomer having two or more ethylenically unsaturated bonds in the molecule thereof wherein at least one ethylenically unsaturated bond is the ethylenically unsaturated bond in an acryloyl group. In present Description, "a monomer having two or more ethylenically unsaturated bonds in the molecule thereof wherein at least one ethylenically unsaturated bond is the ethylenically unsaturated bond in a (meth)acryloyl group" is sometimes referred to as "a multifunctional (meth)acrylate." In the multifunctional (meth)acrylate, all the ethylenically unsaturated bonds in the molecule thereof may be ethylenically unsaturated bonds in the (meth)acryloyl groups.

Examples of the multifunctional (meth)acrylate include trimethylolpropane tri(meth)acrylate, tetramethylolmethane tetra(meth)acrylate, pentaerythritol di(meth)acrylate, pentaerythritol tri(meth)acrylate, pentaerythritol tetra(meth) acrylate, 1,2-ethylene glycol di(meth)acrylate, 1,4-butylene glycol di(meth)acrylate, 1,6-hexanediol di(meth)acrylate, 1,12-dodecanediol di(meth)acrylate, dipentaerythritol monohydroxypenta(meth)acrylate, dipentaerythritol hexa(meth) acrylate, polyethylene glycol di(meth)acrylate, hexanediol di(meth)acrylate, (poly)ethylene glycol di(meth)acrylate, (poly)propylene glycol di(meth)acrylate, neopentylglycol di(meth)acrylate, tetramethylolmethane tri(meth)acrylate, allyl(meth)acrylate, vinyl(meth)acrylate, epoxy acrylate, polyester acrylate, urethane acrylate, and reactive hyperbranched polymers having a plurality of (meth)acryloyl groups at the terminals (for example, trade names: "CN2300," "CN2301" and "CN2320," manufactured by Sartomer Company, Inc.). The multifunctional (meth)acrylates may be used each alone or in combinations of two or more thereof.

The content of the multifunctional monomer in the acrylic pressure-sensitive adhesive composition A is not particularly limited. Specifically, the multifunctional (meth)acrylate is included in the acrylic pressure-sensitive adhesive composition A, the content of the multifunctional (meth)acrylate is preferably 5 parts by weight or less (for example, 0.001 to 5 parts by weight), more preferably 3 parts by weight or less (for example, 0.001 to 3 parts by weight), and furthermore preferably 1 part by weight or less (for example, 0.001 to 1 part by weight) in relation to 100 parts by weight of the monomer mixture. When the content of the multifunctional (meth)acrylate is 5 parts by weight or less, preferably good flexibility is obtained in the acrylic pressure-sensitive adhesive layer and good repulsion resistance is obtained. When the content of the multifunctional (meth)acrylate is 0.001 part by weight or more, preferably sufficient cohesive force is obtained in the acrylic pressure-sensitive adhesive layer, and good adhesion reliability can be obtained.

In the acrylic pressure-sensitive adhesive composition A, the multifunctional monomer (in particular, the multifunctional (meth)acrylate) is preferably included in an appropriately regulated manner in such a way that the below-described solvent-insoluble fraction (the gel fraction) of the acrylic pressure-sensitive adhesive layer is the intended solvent-insoluble fraction.

Moreover, the acrylic pressure-sensitive adhesive composition A may include additives, if necessary, within a range not impairing the advantageous effects of the present invention. Examples of such additives include: cross-linking agents such as an isocyanate-based cross-linking agent and an epoxy-based cross-linking agent; tackifiers such as a rosin derivative, polyterpene resin, petroleum resin and oil-soluble phenol resin; a plasticizer; a filler; an antiaging agent; and a surfactant. The additives may be used each alone or in combinations of two or more thereof.

The acrylic pressure-sensitive adhesive composition A may be regulated so as to have a viscosity (usually, 0.3 to 40 Pa·s as measured with a B-type viscometer under the condition of a measurement temperature of 25° C.) appropriate for coating from the viewpoint of the handleability of the acrylic pressure-sensitive adhesive composition A. For the purpose of obtaining the foregoing viscosity, the acrylic pressure-sensitive adhesive composition A preferably includes the partially polymerized substance of the monomer mixture. A polymer for thickening may also be mixed in the acrylic pressure-sensitive adhesive composition A.

As described above, the partially polymerized substance of the monomer mixture means a composition in which one or two or more monomer components included in the monomer mixture are partially polymerized. The partially polymerized substance of the monomer mixture is, in some cases, viscous and syrupy depending on the polymerization percentage thereof.

The partially polymerized substance of the monomer mixture is obtained by polymerizing part of the monomer components included in the monomer mixture. For example, the partially polymerized substance of the monomer mixture is obtained by irradiating the monomer mixture with an active energy ray (in particular, ultraviolet ray) while the contact of the monomer mixture with oxygen is being avoided.

The polymerization percentage of the partially polymerized substance of the monomer mixture is not particularly limited, but is preferably 2 to 40% by weight and more preferably 5 to 20% by weight, for the purpose of allowing the acrylic pressure-sensitive adhesive composition A to have a viscosity appropriate for handling or coating.

The polymerization percentage of the partially polymerized substance is determined as follows. A sample is prepared by sampling a fraction of the partially polymerized substance. The sample is weighed precisely to determine the weight thereof, which is defined as "the weight of the partially polymerized substance before drying." Next, the sample is dried at 130° C. for 2 hours, and the sample after drying is weighed precisely to determine the weight thereof, which is defined as "the weight of the partially polymerized substance after drying." Then, from "the weight of the partially polymerized substance before drying" and "the weight of the partially polymerized substance after drying," the weight decrement of the sample caused by the drying at 130° C. for 2 hours is derived and defined as "the weight decrement" (volatile matter content, weight of unreacted monomers).

From the obtained "weight of the partially polymerized substance before drying" and "weight decrement," the polymerization percentage (% by weight) of the partially polymerized substance is determined:

polymerization percentage (% by weight) of partially polymerized substance=[1−(weight decrement)/(weight of partially polymerized substance before drying)]×100

The method for producing the acrylic pressure-sensitive adhesive composition is not particularly limited; however, examples of the foregoing method include a method in which in the monomer mixture or the partially polymerized substance of the monomer mixture, the components (such as a heat-expandable micro particle, a multifunctional monomer such as the multifunctional (meth)acrylate and additives) to be added if necessary are mixed.

The acrylic pressure-sensitive adhesive layer is formed with a heretofore known or conventional method. For example, on an appropriate support such as a release film or a backing film, the acrylic pressure-sensitive adhesive composition is applied to prepare an acrylic pressure-sensitive adhesive composition layer, and then, the acrylic pressure-sensitive adhesive composition layer is, according to need, dried or cured (for example, curing by heat or an active energy ray) to form the acrylic pressure-sensitive adhesive layer. When curing (photocuring) with an active energy ray is utilized, the photopolymerization reaction is inhibited by the oxygen in the air, and hence, it is preferable to block the oxygen, for example, by laminating a release film (separator) on the pressure-sensitive adhesive composition layer or by photocuring in a nitrogen atmosphere.

The solvent-insoluble fraction (gel fraction) of the acrylic pressure-sensitive adhesive layer is 50% (% by weight) or more (for example, 50 to 90%), preferably 60% or more (for example, 60 to 90%) and more preferably 65% or more (for example, 65 to 85%). The solvent-insoluble fraction of 50% or more facilitates the occurrence of the degradation of the adhesive strength, in particular, the degradation of the adhesive strength due to the foaming of the heat-expandable micro particle in the case where the heat-expandable micro particle is included. The solvent-insoluble fraction of 50% or more also preferably facilitates the below-described regulation of the adhesive force to glass. The solvent-insoluble fraction of 90% or less preferably allows good wettability to be obtained.

The solvent-insoluble fraction of the acrylic pressure-sensitive adhesive layer means "the proportion of the solvent-insoluble fraction" in the pressure-sensitive adhesive layer, and is a value derived by the following "measurement method of the solvent-insoluble fraction in the pressure-sensitive adhesive layer." The solvent-insoluble fraction of the pressure-sensitive adhesive layer includes the solvent-insoluble heat-expandable micro particle.

Measurement Method of Solvent-Insoluble Fraction in Pressure-Sensitive Adhesive Layer About 1 g of the pressure-sensitive adhesive layer is sampled, and the sampled fraction of the pressure-sensitive adhesive layer is used as a sample. The sample is weighed precisely to determine the weight thereof, which is defined as "the weight of the pressure-sensitive adhesive layer before immersion." Next, the sample is immersed in 40 g of ethyl acetate for 7 days, then all the component insoluble (insoluble fraction) in ethyl acetate are collected, the whole collected insoluble fraction is dried at 130° C. for 2 hours, and the weight of the dried insoluble fraction is determined and defined as "the dry weight of the insoluble fraction." Then, the obtained numerical value is substituted into the following formula to derive the insoluble fraction:

solvent-insoluble fraction(%)=[(dry weight of insoluble fraction)/(weight of pressure-sensitive adhesive layer before immersion)]×100

The thickness of the acrylic pressure-sensitive adhesive layer is appropriately selected; however, for the purpose of maintaining the smoothness of the surface of the acrylic pressure-sensitive adhesive layer, when the heat-expandable micro particle (in particular, the heat-expandable microsphere) is included, the thickness of the acrylic pressure-sensitive adhesive layer is preferably set at the maximum particle size of the heat-expandable micro particle or more. The thickness of the acrylic pressure-sensitive adhesive layer is not particularly limited, but is preferably 10 to 2000 µm, more preferably 30 to 1000 µm and furthermore preferably 50 to 500 µm, for the purpose of allowing the adhesion reliability, the separability/debondability and the below-described adhesive force to glass to have intended values, respectively. The acrylic pressure-sensitive adhesive layer may have a single-layered structure or a laminated structure.

(Backing Film)

From what has been described above, the pressure-sensitive adhesive sheet for glass plates of the present invention may be a pressure-sensitive adhesive sheet with a backing film. Such a backing film is not particularly limited; however, examples of such a backing film include: paper-based backing film such as paper; fiber based-backing films such as cloth, non-woven fabric and nets; metal-based backing films such as metal foil and metal plate; plastic backing films such as films and sheets based on various resins (such as olefin resins, polyester resins, polyvinyl chloride resins, vinyl acetate resins, amide resins, polyimide resins, polyether ether ketone (PEEK) and polyphenylene sulfide (PPS)); rubber-based backing films such as rubber sheet; foams such as foam sheet, and laminates of these (in particular, laminates of plastic backing films and other backing films, and laminates of plastic films (or sheets)). As a backing film, a below-described heat-generating layer may also be used.

Examples of the backing film also include heat shrink films. A heat shrink film is a film to shrink by heating at least along an arbitrary axis direction through utilizing the internal stress or the like based on the molecular orientation of a stretched film. When the backing film is a heat shrink film, a peeling effect due to the heat shrink (deformation) of the backing film is caused by heating at the time of peeling of the pressure-sensitive adhesive sheet from the surface of a glass member, and thus the adhesive strength of the pressure-sensitive adhesive sheet can be easily degraded. When the backing film is a heat shrink film, the below-described adhesive force to glass can be easily regulated.

In the case of a pressure-sensitive adhesive sheet with a backing film, having a heat expandable particle-containing acrylic pressure-sensitive adhesive layer at least on one side of the heat shrink film as the backing film, by heating at the time of peeling of the pressure-sensitive adhesive sheet from the surface of a glass member, the peeling effect due to the heat shrink (deformation) of the heat shrink film operates, in addition to the degradation of the adhesive force due to the deformation of the acrylic pressure-sensitive adhesive layer caused by the foaming of the heat-expandable micro particle, and thus, the adhesive strength of the pressure-sensitive adhesive sheet can be more easily degraded.

As the heat shrink film, a heat shrink film is preferable in which the heat shrink rate in the principal shrink direction as evaluated by the following measurement method is 5% or more (more preferably 8% or more, furthermore preferably 10% or more and particularly preferably 20% or more) at any temperature between 70 and 180° C. (for example, 80° C., 145° C. and 170° C.). When the heat shrink rate is 5% or more, preferably a force to peel the pressure-sensitive adhesive layer from the adherend is exerted to lead to easy occurrence of efficient peeling. When the shrink rate is less than 5%, no sufficient volume change of the heat shrink film is obtained, and hence efficient peeling is sometimes difficult to occur. The upper limit of the heat shrink rate is usually 90%.

(Measurement of Heat Shrink Rate)

A heat shrink film is cut to a square having an optional size (for example, 20 mm×20 mm) to prepare a specimen. Next, the specimen is placed in a hot air dryer and heat treated at a predetermined temperature for 4 minutes. The size of the heat treated film is measured, and the shrink rate is derived with the following formula:

shrink rate(%)=[(size before shrink)−(size after shrink)/(size before shrink)]×100

In particular, in the pressure-sensitive adhesive sheet with a backing film, having the heat-expandable micro particle-containing acrylic pressure-sensitive adhesive layer at least on one side of the heat shrink film as the backing film, at the temperature (expansion temperature, foaming temperature) at which the heat-expandable micro particle expands, the shrink rate of the heat shrink film in the principal shrink direction evaluated by the foregoing measurement method is preferably 5% or more (more preferably 10% or more). This is because when the shrink of the heat shrink film and the expansion of the heat-expandable microsphere occur simultaneously, a synergetic effect occurs between (i) the effect of the peeling from the adherend due to the deformation of the pressure-sensitive adhesive layer due to the shrink of the heat shrink film, and (ii) the effect of the degradation or the loss of the adhesive force due to the deformation into an irregular shape of the surface of the pressure-sensitive adhesive layer caused by the expansion deformation of the pressure-sensitive adhesive layer due to the expansion and/or the foaming of the heat-expandable micro particle.

The material constituting the heat shrink film is not particularly limited; however, examples of the material constituting the heat shrink film include: polyolefin resins such as polypropylene and polyethylene; polyester resins such as polybutylene terephthalate and polyethylene terephthalate; polynorbornene resin; polyimide resin; polyamide resin; polyurethane resin; polyvinyl chloride resin; polyvinylidene chloride resin; and polystyrene resin. The foregoing materials may be used each alone or in combinations of two or more thereof.

Among these materials, polyester resin is preferable as the material constituting the heat shrink film. In other words, the heat shrink film is preferably a heat shrink film made of polyester resin. The heat shrink film made of polyester resin has an advantage that the adhesive force (anchoring capability) to the pressure-sensitive adhesive layer is high and no primer coating treatment is needed.

The heat shrink film may be a commercially available product. Examples of the commercially available shrink film include: "Space Clean" (trade name, manufactured by Toyobo Co., Ltd.), "Fancy Wrap" (trade name, manufactured by Gunze Ltd.), "Torayfan" (trade name, manufactured by Toray Industries, Inc.), "Arton" (trade name, manufactured by JSR Corp.), "Zeonoa" (trade name, manufactured by Zeon Corp.) and "Suntec" (trade name, manufactured by Asahi Kasei Corp.).

The thickness of the backing film (in particular, the thickness of the heat shrink film) is not particularly limited, but is preferably 10 to 500 μm, more preferably 12 to 200 μm and furthermore preferably 15 to 100 μm. The backing film may have a single-layered form or a multiple-layered form. The backing film may be subjected to, if necessary, various treatment such as back side treatment, antistatic treatment and primer coating treatment.

(Other Layers)

The pressure-sensitive adhesive sheet for glass plates of the present invention may have other layers in addition to the acrylic pressure-sensitive adhesive layer and the backing film, within a range not impairing the advantageous effects of the present invention.

Examples of the other layers include a heat-generating layer. The heat-generating layer is a layer capable of generating heat when needed. When the pressure-sensitive adhesive sheet for glass plates of the present invention has a heat-generating layer, by allowing the heat-generating layer to generate heat, it is possible to cause the shrink of the heat shrink film as the backing film or the expansion deformation of the pressure-sensitive adhesive layer due to the expansion and/or the foaming of the heat-expandable micro particle in the heat-expandable micro particle-containing acrylic pressure-sensitive adhesive layer.

The heat-generating layer is not particularly limited, but is preferably a sheet-shaped heat generator. The sheet-shaped heat generator generates heat by energization, and at least has a heat-generating element having a flat plate shape or a sheet shape. Examples of the heat-generating element having a flat plate shape or a sheet shape include metal foil, metal plates, sheet-shaped graphite carbon, and sheet-shaped materials including carbon powder or metal powder. The sheet-shaped heat generator may include an electrical insulation sheet for covering the heat-generating element having a flat plate shape or a sheet shape.

The thickness of the heat-generating layer is not particularly limited, but is preferably 10 to 300 μm and more preferably 10 to 150 μm.

The pressure-sensitive adhesive sheet for glass plates of the present invention may be a pressure-sensitive adhesive sheet with a backing film in which the sheet-shaped heat generator is the backing film.

Examples of the foregoing other layers include pressure-sensitive adhesive layers other than the intermediate layer, the primer layer and the acrylic pressure-sensitive adhesive layer.

(Release Film)

The pressure-sensitive adhesive sheet for glass plates of the present invention may be protected with a release film until the time of being used for the purpose of protecting the pressure-sensitive adhesive surface. The release film is not particularly limited; however, examples of the release film include, in addition to the liner at least one side of which is release treated (subjected to mold release treatment) with a release treatment agent (a mold release treatment agent), low adhesive liners made of fluorine-based polymers (such as polytetrafluoroethylene, polychlorotrifluoroethylene, polyvinyl fluoride, polyvinylidene fluoride, tetrafluoroethylene-hexafluoropropylene copolymer and chlorofluoroethylene-vinylidene fluoride copolymer), and low adhesive liners made of nonpolar polymers (such as olefin resins such as polyethylene and polypropylene). In a low adhesive liner, both sides thereof are utilized as release surface; on the other hand, in a release-treated liner, the release-treated surface is utilized as the release surface. The release film is formed with a heretofore known or conventional method.

Examples of the liner (liner for release film) in the liner at least one side of which is release-treated with the release treatment agent include: polyester films such as polyethylene terephthalate film; olefin resin films such as polyethylene film and polypropylene film; polyvinyl chloride film; polyimide film; polyamide films such as nylon film; and plastic liner films (synthetic resin films) such as rayon film. Additional examples of the liner include paper-based liners constituted with various types of paper such as high-quality paper, Japanese paper, craft paper, glassine paper, synthetic paper and top coat paper. Among these, polyester films such as polyethylene terephthalate film are preferable.

The release treatment agent in the liner (the liner for the release film) at least one side of which is release-treated with the release treatment agent is not particularly limited; however, examples of such release treatment agent include a silicone-based release treatment agent, a fluorine-based release treatment agent and a long-chain alkyl-based release treatment agent. The release treatment agents may be used each alone or in combinations of two or more thereof.

The thickness of the release film is not particularly limited. The release film may have a single-layered form or a laminated form.

(Pressure-Sensitive Adhesive Sheet)

The adhesive force to glass of the pressure-sensitive adhesive sheet of the present invention as measured with the following measurement method (adhesive force to glass) is 12.0 N or less, preferably 10.0 N or less and more preferably 8.0 N or less. The adhesive force to glass may be 0 N.

The pressure-sensitive adhesive sheet for glass plates of the present invention has the foregoing adhesive force to glass of 12.0 N or less, hence by performing heat treatment after the use, the adhesive strength can be reduced to such a degree of adhesive strength that allows glass plate not to be cracked, and thus good separability (reworkability) from a glass plate or a surface of a glass member can be obtained.

[Measurement Method of Adhesive Force to Glass]

By using a pressure-sensitive adhesive sheet (width: 26 mm, length: 40 mm), a glass plate A (width: 50 mm, length: 100 mm, thickness: 0.7 mm) and a glass plate B (width: 26 mm, length: 760 mm, thickness: 1.0 mm) are laminated on each other to yield a laminate in such a way that: the size of the adhesion portion is 26 mm in width and 40 mm in length; the lengthwise direction of the pressure-sensitive adhesive sheet, the lengthwise direction of the glass plate A and the lengthwise direction of the glass plate B are the same as each other; and one lengthwise end A (adhesion end A) and one lengthwise end of the glass plate B are superposed to each other. The resulting laminate is allowed to stand in an atmosphere of 23° C. for 30 minutes, and then autoclave treated under the conditions of a pressure of 5 atm, a temperature of 50° C. and a period of tine of 15 minutes. Then, the laminate after the autoclave treatment is heat treated under the conditions of a temperature of 145° C. and a period of time of 4 minutes. Then, the laminate after the heat treatment is allowed to stand in an atmosphere of 23° C. for 30 minutes, successively the portion of the glass plate B located at a distance displaced by 20 mm in the lengthwise direction from the end B (the adhesion end B) opposite to the end A in the pressure-sensitive adhesive sheet and not brought into contact with the pressure-sensitive adhesive sheet is pulled at a tensile rate of 300 mm/min in the thickness direction of the laminate toward the side of the glass plate B, and the force (N) required to peel the glass plate B is determined. The force required for the peeling is defined as the adhesive force to glass.

In present Description, the adhesive force to glass determined by the foregoing measurement method is sometimes simply referred to as "the adhesive force to glass."

Figure 2:
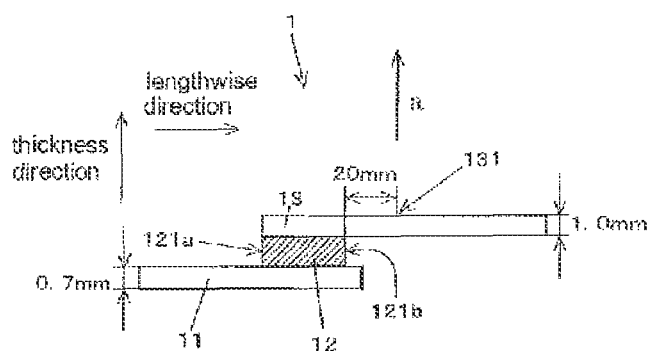
FIG. 2 is a schematic cross-sectional view (cross-sectional view along the line segment A-A') illustrating the laminate to be used at the time of measuring the adhesive force to glass.

The measurement method of the adhesive force to glass is described in detail with reference to FIGS. 1 and 2. FIGS. 1 and 2 illustrate a laminate 1 to be used at the time of measuring the adhesive force to glass. The adhesive force to glass is determined with this laminate 1. Specifically, by using a pressure-sensitive adhesive sheet 12, a glass plate A (11) and a glass plate B (13) are laminated on each other to prepare the laminate 1, then the resulting laminate 1 is subjected to aging (at 23° C. for 30 minutes), the laminate after the aging is autoclave treated (pressure: 5 atm, temperature: 50° C., period of time: 15 minutes), then the laminate 1 after the autoclave treatment is heat treated (temperature: 145° C., period of time: 4 minutes), and then the pulling portion 131 of the glass plate B (13) in the laminate 1 after the heat treatment is pulled at a tensile rate of 300 mm/min in the thickness direction (the pulling direction a) of the laminate 1 toward the side of the glass plate B, and the force (N) required to peel the glass plate B (13) is measured to determine the adhesive force to glass. The pressure-sensitive adhesive sheet 12 is a double-sided pressure-sensitive adhesive sheet.

The laminate 1 is obtained by laminating the glass plate A (11) (width: 50 mm, length: 100 mm, thickness: 0.7 mm) and the glass plate B (13) (width: 26 mm, length: 760 mm, thickness: 1.0 mm) on each other with the pressure-sensitive adhesive sheet 12 (width: 26 mm, length: 40 mm) so as to have the positional relation shown in FIGS. 1 and 2. The lamination is performed in an atmosphere of 23° C. At the time of the lamination, the pressure bonding conditions are such that a 2-kg roller is used in a single back and forth movement. For example, the laminate 1 is prepared as follows: in an atmosphere of 23° C., the pressure-sensitive adhesive sheet 12 is superposed on the glass plate B (13) in such a way that one lengthwise end (the end on the end A (121a) side) of the glass plate B (13) and one end (the end A (121a)) of the pressure-sensitive adhesive sheet 12 are superposed on each other, and the lengthwise direction of the pressure sensitive adhesive sheet 12 and the lengthwise direction of the glass plate B (13) are the same as each other; then the pressure-sensitive adhesive sheet 12 is laminated on the glass plate B (13) by pressure bonding under the condition of a single back and forth movement of a 2-kg roller; then, in an atmosphere of 23° C., the laminate obtained by laminating the pressure-sensitive adhesive sheet 12 and the glass plate B (13) is superposed on the glass plate A (11) in such a way that the lengthwise direction of the pressure-sensitive adhesive sheet 12, the lengthwise direction of the glass plate B (13) and the lengthwise direction of the glass plate A (11) are the same as each other, and then the laminate 1 is prepared by laminating the laminate of the pressure-sensitive adhesive sheet 12 and the glass plate B (13) on the glass plate A (11) by pressure bonding under the condition of a single back and forth movement of a 2-kg roller. In the laminate 1, the glass plate A (11) and the glass plate B (13) are made to adhere to each other with the aid of the pressure-sensitive adhesive sheet 12.

The laminate 1 is constituted with the glass plate A (11), the pressure-sensitive adhesive sheet 12 and the glass plate B (13). The area of the adhesion portion of the laminate 1 is the same as the area of the pressure-sensitive adhesive sheet 12, and is 26 mm in width and 40 mm in length. In the laminate 1, the lengthwise direction of the pressure-sensitive adhesive sheet (12), the lengthwise direction of the glass plate A (11) and the lengthwise direction of the glass plate B (13) are the same as each other. In other words, the widthwise direction of the pressure-sensitive adhesive sheet (12), the widthwise direction of the glass plate A (11) and the widthwise direction of the glass plate B (13) are the same as each other. The lengthwise one end A (121a) (the adhesion end A (121a)) of the pressure-sensitive adhesive sheet 12 and one end of the glass plate B (13) are superposed on each other.

Examples of the glass plate A include "soda glass #0050" (manufactured by Matsunami Glass Ind., Ltd.). Examples of the glass plate B include "slide glass S1112" (manufactured by Matsunami Glass Ind., Ltd.).

The laminate 1 is autoclave-treated after the preparation and then heat treated. Examples of the heat treatment include a treatment using a hot air dryer.

The laminate 1 after the heat treatment is pulled up in the thickness direction (namely, the pulling direction a) toward the side of the glass plate B of the laminate 1 at the pulling portion (131) of the glass plate B (13) located at a distance displaced by 20 mm in the lengthwise direction from the end B (121b) (the adhesion end B (121b)). When the glass plate B of the laminate 1 after the heat treatment is pulled up, a tensile tester may be used.

The pulling portion (131) of the glass plate B (13) is a portion displaced by 20 mm in the lengthwise direction from the end B (121b) opposite to the end A (121a) in the pressure-sensitive adhesive sheet 12 and is a portion not brought into contact with the pressure-sensitive adhesive sheet. In other words, the pulling portion (131) is a portion of the glass plate B located on the side not brought into contact with the pressure-sensitive adhesive sheet 12, at a distance displaced by 20 mm in the lengthwise direction from the end B (121b) opposite to the end A (121a) in the pressure-sensitive adhesive sheet 12. Also, in other words, the pulling portion (131) is a portion of the glass plate B (13) located at a distance displaced by 60 mm in the lengthwise direction from the end A (121a) in the pressure-sensitive adhesive sheet 12.

The initial adhesive force in the pressure-sensitive adhesive sheet for glass plates of the present invention determined by the following measurement method is not particularly limited, but is preferably 3.0 N/20 mm or more (for example, 3.0 to 12.0 N/20 mm), more preferably 4.0 N/20 mm or more (for example, 4.0 to 12.0 N/20 mm) and furthermore preferably 5.0 N/20 mm or more (for example, 5.0 to 12.0 N/20 mm). When the initial adhesive force is 3.0 N/20 mm or more, preferably good adhesiveness to a glass plate or a surface of a glass member is obtained. Even when the initial adhesive force is high, the adhesive force can be reduced by heat treatment, and a adhesive force to glass of a specific value or less can be obtained; however, when the initial adhesive force is 12.0 N/20 mm or less, at the time of heat treatment to peel the pressure-sensitive adhesive sheet after the use of the pressure-sensitive adhesive sheet for a surface of a glass member or a glass plate, preferably it is possible to more suppress the peeling failure of the pressure-sensitive adhesive sheet or the breakage or cracking of the surface of a glass member or the glass plate.

[Measurement Method of Initial Adhesive Force]

In an atmosphere of 23° C., a pressure-sensitive adhesive sheet is laminated to a glass plate by pressure bonding under the condition of a single back and forth movement of a 2-kg roller, and is allowed to stand in an atmosphere of 23° C. for 30 minutes. After being allowed to stand, the pressure-sensitive adhesive sheet is peeled under the conditions of a peeling rate of 300 mm/min and a peeling direction of 180°, and the 180° peeling adhesive strength (N/20 mm) is determined. And, the resulting 180° peeling adhesive strength is defined as the initial adhesive force.

The thickness of the pressure-sensitive adhesive sheet for glass plates of the present invention is not particularly limited, but is 10 to 2000 μm and preferably 30 to 1000 μm. The thickness of the pressure-sensitive adhesive sheet for glass plates does not include the thickness of the release film to protect the pressure-sensitive adhesive surface.

The pressure-sensitive adhesive sheet for glass plates of the present invention may have a shape different from a sheet shape by being processed after the preparation thereof. For example, the pressure-sensitive adhesive sheet for glass plates may have a frame shape (a picture frame-like shape such as a frame shape of 0.5 to 10 mm in width (preferably 0.5 to 3 mm in width)).

The method for preparing the pressure-sensitive adhesive sheet for glass plates of the present invention is not particularly limited, and may be prepared by a heretofore known or conventional method. The backing film-less pressure-sensitive adhesive sheet constituted only with the acrylic pressure-sensitive adhesive layer is prepared, for example, as follows: the acrylic pressure-sensitive adhesive composition is applied to the release film to obtain an acrylic pressure-sensitive adhesive composition layer, and the resulting acrylic pressure-sensitive adhesive composition layer is cured to obtain the acrylic pressure-sensitive adhesive layer. The pressure-sensitive adhesive sheet with a backing film constituted at least with the backing film and the pressure-sensitive adhesive layer is prepared, for example, as follows: the acrylic pressure-sensitive adhesive composition is applied is applied at least to one side of the backing film to obtain an acrylic pressure-sensitive adhesive composition layer, and the resulting acrylic pressure-sensitive adhesive composition layer is cured to obtain the acrylic pressure-sensitive adhesive layer. The pressure-sensitive adhesive sheet with a backing film may also be prepared by transferring the acrylic pressure-sensitive adhesive layer prepared separately onto at least one side of the backing film.

The pressure-sensitive adhesive sheet for glass plates of the present invention is large in adhesive force when used for a surface of a glass member, and allows the adhesive force thereof to be reduced to such a degree that leads to no occurrence of the cracking or breakage of the glass member when the pressure-sensitive adhesive sheet is peeled from the surface of the glass member. Moreover, the pressure-sensitive adhesive sheet for glass plates of the present invention has a property such that the adhesiveness thereof to an adherend (in particular, a glass plate or a surface of a glass member) is degraded by heating. In other words, the pressure-sensitive adhesive sheet for glass plates of the present invention has heat separability.

The pressure-sensitive adhesive sheet for glass plates of the present invention can reduce the adhesive force thereof to such a degree that leads to no occurrence of the cracking or breakage of a glass member when peeled from a surface of the glass member. In other words, the pressure-sensitive adhesive sheet for glass plates of the present invention has easy peelability. Accordingly, the pressure-sensitive adhesive sheet for glass plates of the present invention is preferably used for electronic devices. This is because the pressure-sensitive adhesive sheet for glass plates of the present invention is advantageous in a case where a top glass member is separated (reworked) because of a failure during the production process of an electronic device, or in a case where an image display section is recovered to be reused (recycled) after a certain period of elapsed time.

The pressure-sensitive adhesive sheet for glass plates of the present invention is preferably used for portable electronic devices, in particular, portable electronic devices having glass plate screens (glass lenses, top glass members). For example, the pressure-sensitive adhesive sheet for glass plates of the present invention is used for fixing glass plate to enclosures, for mutual laminating of glass plates, for laminating of glass lenses and touch panels, for laminating glass plates and display panels, and for laminating glass plates and various components and various modules constituting portable electronic devices. In present Description, a display panel means a structural object constituted at least with a glass lens and a touch panel. The lens means a concept including both of a transparent object exhibiting the refraction effect of light and a transparent object exhibiting no refraction effect of light. In other words, the lenses include window panels having no refraction effect.

Examples of such portable electronic devices include: cell phones, PHS, smart phones, tablets (tablet-type computers), mobile computers (mobile PCs), personal digital assistants (PDAs), electronic notebooks, portable broadcast receivers such as portable television sets or portable radio sets, portable game machines, portable audio players, portable DVD players, cameras such as digital cameras, and camcorder type video cameras.

The size and thickness of a glass plate for which the pressure-sensitive adhesive sheet for glass plates of the present invention is used are not particularly limited. The width of a glass plate for which the pressure-sensitive adhesive sheet for glass plates of the present invention is preferably used is, for example, preferably 50 to 300 mm and more preferably 100 to 250 mm. The length of a glass plate for which the pressure-sensitive adhesive sheet for glass plates of the present invention is preferably used is, for example, preferably 80 to 300 mm and more preferably 100 to 250 mm. The thickness of a glass plate for which the pressure-sensitive adhesive sheet for glass plates of the present invention is preferably used is, for example, preferably 0.5 to 2.0 mm and more preferably 0.5 to 1.0 mm. The area of a glass plate for which the pressure-sensitive adhesive sheet for glass plates of the present invention is preferably used is, for example, preferably 4000 to 20000 $mm^2$ and more preferably 10000 to 18000 $mm^2$.

EXAMPLES

Hereinafter, the present invention is described in more detail with reference to Examples; however, the present invention is not limited by these Examples in any way.

(Preparation of Heat-Expandable Micro Particle-Containing Pressure-Sensitive Adhesive Composition A)

In a four-neck flask, 100 parts by weight of a monomer mixture composed of 70 parts by weight of 2-ethylhexyl acrylate (2EHA), 20 parts by weight of N-vinyl caprolactam (NVC) and 10 parts by weight of isobornyl acrylate (IBXA), 0.05 part by weight of 1-hydroxy-cyclohexyl-phenyl-ketone (trade name: "Irgacure 184," manufactured by BASF Japan Ltd.) as a photopolymerization initiator and 0.05 part by weight of 2,2-dimethoxy-1,2-diphenylethan-1-one (trade name: "Irgacure 651," manufactured by BASF Japan Ltd.) as a photopolymerization initiator were placed; the resulting mixture was irradiated with ultraviolet ray to be photopolymerized in a nitrogen atmosphere, until the viscosity of the mixture reached approximately 15 Pa·s (BH viscometer, No. 5 rotor, 10 rpm, temperature: 30° C.), and thus a partially polymerized monomer syrup (a partially polymerized substance of the monomer components) was obtained. The polymerization percentage of the partially polymerized monomer syrup was 7.2% by weight.

To 100 parts by weight of the partially polymerized monomer syrup, 30 parts by weight of a heat-expandable micro particle (a foaming agent, trade name: ""Expancel 051 Du 40," manufactured by Expancel, Inc.) and 0.028 part by weight of 1,6-hexanediol diacrylate (HDDA) as a multifunctional (meth)acrylate were added, and the resulting mixture was uniformly mixed to yield the heat-expandable micro particle-containing pressure-sensitive adhesive composition A.

(Preparation of Heat-Expandable Micro Particle-Containing Pressure-Sensitive Adhesive Composition B)

By using a monomer mixture composed of 60 parts by weight of 2-ethylhexyl acrylate (2EHA), 30 parts by weight of dimethyl acrylamide (DMAA) and 10 parts by weight of isobornyl acrylate (IBXA), a partially polymerized monomer syrup was obtained in the same manner as in the preparation of the heat-expandable micro particle-containing pressure-sensitive adhesive composition A. The polymerization percentage of the partially polymerized monomer syrup was 12.6% by weight.

To 100 parts by weight of the partially polymerized monomer syrup, 20 parts by weight of a heat-expandable micro particle (foaming agent, trade name: "Expancel 051 Du 40," manufactured by Expancel, Inc.) and 0.08 part by weight of 1,6-hexanediol diacrylate (HDDA) as a multifunctional (meth)acrylate were added, and the resulting mixture was uniformly mixed to yield the heat-expandable micro particle-containing pressure-sensitive adhesive composition B.

(Preparation of Heat-Expandable Micro Particle-Containing Pressure-Sensitive Adhesive Composition C)

By using a monomer mixture composed of 80 parts by weight of 2-ethylhexyl acrylate (2EHA) and 20 parts by weight of N-vinylpyrrolidone (NVP), a partially polymerized monomer syrup was obtained in the same manner as in the preparation of the heat-expandable micro particle-containing pressure-sensitive adhesive composition A. The polymerization percentage of the partially polymerized monomer syrup was 11.2% by weight.

By using the partially polymerized monomer syrup, the heat-expandable micro particle-containing pressure-sensitive adhesive composition C was obtained in the same manner as in the preparation of the heat-expandable micro particle-containing pressure-sensitive adhesive composition A.

(Preparation of Heat-Expandable Micro Particle-Containing Pressure-Sensitive Adhesive Composition D)

By using a monomer mixture composed of 80 parts by weight of 2-ethylhexyl acrylate (2EHA) and 20 parts by weight of N-vinyl caprolactam (NVC), a partially polymerized monomer syrup was obtained in the same manner as in the preparation of the heat-expandable micro particle-containing pressure-sensitive adhesive composition A. The polymerization percentage of the partially polymerized monomer syrup was 11.0% by weight.

By using the partially polymerized monomer syrup, the heat-expandable micro particle-containing pressure-sensitive adhesive composition D was obtained in the same manner as in the preparation of the heat-expandable micro particle-containing pressure-sensitive adhesive composition A.

(Preparation of Heat-Expandable Micro Particle-Containing Pressure-Sensitive Adhesive Composition E)

By using a monomer mixture composed of 80 parts by weight of 2-ethylhexyl acrylate (2EHA) and 20 parts by weight of isobornyl acrylate (IBXA), a partially polymerized monomer syrup was obtained in the same manner as in the preparation of the heat-expandable micro particle-containing pressure-sensitive adhesive composition A. The polymerization percentage of the partially polymerized monomer syrup was 11.0% by weight.

By using the partially polymerized monomer syrup, the heat-expandable micro particle-containing pressure-sensitive adhesive composition E was obtained in the same manner as in the preparation of the heat-expandable micro particle-containing pressure-sensitive adhesive composition A.

(Preparation of Heat-Expandable Micro Particle-Containing Pressure-Sensitive Adhesive Composition F)

By using a monomer mixture composed of 80 parts by weight of butyl acrylate (BA) and 20 parts by weight of dimethyl acrylamide (DMAA), a partially polymerized monomer syrup was obtained in the same manner as in the preparation of the heat-expandable micro particle-containing pressure-sensitive adhesive composition A. The polymerization percentage of the partially polymerized monomer syrup was 11.0% by weight.

By using the partially polymerized monomer syrup, the heat-expandable micro particle-containing pressure-sensitive adhesive composition F was obtained in the same manner as in the preparation of the heat-expandable micro particle-containing pressure-sensitive adhesive composition A.

(Preparation of Heat-Expandable Micro Particle-Containing Pressure-Sensitive Adhesive Composition G)

The heat-expandable micro particle-containing pressure-sensitive adhesive composition G was obtained in the same manner as in the preparation of the heat-expandable micro particle-containing pressure-sensitive adhesive composition A except that the heat-expandable micro particle (foaming agent, trade name: "Expancel 051 Du 40," manufactured by Expancel, Inc.) was not used.

(Preparation of Heat-Expandable Micro Particle-Containing Pressure-Sensitive Adhesive Composition H)

By using a monomer mixture composed of 75 parts by weight of 2-ethylhexyl acrylate (2EHA) and 25 parts by weight of acrylic acid (AA), a partially polymerized monomer syrup was obtained in the same manner as in the preparation of the heat-expandable micro particle-containing pressure-sensitive adhesive composition A. The polymerization percentage of the partially polymerized monomer syrup was 7.0% by weight.

To 100 parts by weight of the partially polymerized monomer syrup, 20 parts by weight of the heat-expandable micro particle (foaming agent, trade name: "Expancel 051 Du 40," manufactured by Expancel, Inc.) and 0.04 part by weight of 1,6-hexanediol diacrylate (HDDA) as a multifunctional (meth)acrylate were added, and the resulting mixture was uniformly mixed to yield the heat-expandable micro particle-containing pressure-sensitive adhesive composition H.

(Preparation of Heat-Expandable Micro Particle-Containing Pressure-Sensitive Adhesive Composition I)

By using a monomer mixture composed of 90 parts by weight of 2-ethylhexyl acrylate (2EHA) and 10 parts by weight of acrylic acid (AA), a partially polymerized monomer syrup was obtained in the same manner as in the preparation of the heat-expandable micro particle-containing pressure-sensitive adhesive composition A. The polymerization percentage of the partially polymerized monomer syrup was 8.0% by weight.

By using the partially polymerized monomer syrup, the heat-expandable micro particle-containing pressure-sensitive adhesive composition I was obtained in the same manner as in the preparation of the heat-expandable micro particle-containing pressure-sensitive adhesive composition A.

Use Example 1 of Backing Film

As a backing film, a 50-μm thick PET film (trade name; "Lumilar S-50," manufactured by Toray Industries, Inc.) was used. The PET film is referred to as the backing film A.

Use Example 2 of Backing Film

As a backing film, a heat shrink film (trade name; "Space Clean S7200," manufactured by Toyobo Co., Ltd., thickness: 30 μm, shrinkage percentage at 145° C.: 35%) was used. The heat shrink film is referred to as the backing film B.

Use Example 1 of Release Film

As a release film, a polyethylene terephthalate (PET) film (trade name: "Diafoil MRN-38," manufactured by Mitsubishi Plastics, Inc.) one side of which was release-treated with a silicone-based release treatment agent was used. The release film is referred to as the release film A.

Example 1

Backing Film-Less Double-Sided Pressure-Sensitive Adhesive Sheet

The heat-expandable micro particle-containing pressure-sensitive adhesive composition A was applied to the release-treated surface of the release film A so as for the thickness of the pressure-sensitive adhesive layer after curing to be 50 μm, and thus a heat-expandable micro particle-containing pressure-sensitive adhesive composition layer was formed. Next, on the heat-expandable micro particle-containing pressure-sensitive adhesive composition layer, another sheet of the release film A was laminated in such a way that the release-treated surface and the heat-expandable micro particle-containing pressure-sensitive adhesive composition layer were brought into contact with each other, to yield a sheet (a heat-expandable micro particle-containing pressure-sensitive adhesive composition layer sheet) having a heat-expandable micro particle-containing pressure-sensitive adhesive composition layer between two sheets of the release film.

The heat-expandable micro particle-containing pressure-sensitive adhesive composition layer sheet was irradiated with ultraviolet ray under the conditions of an illuminance of 4 mW/cm$^2$ and a light intensity of 1200 mJ/cm$^2$ to photocure the heat-expandable micro particle-containing pressure-sensitive adhesive composition layer and thus a backing film-less double-sided pressure-sensitive adhesive sheet having a heat-expandable micro particle-containing pressure-sensitive adhesive layer was prepared.

The backing film-less double-sided pressure-sensitive adhesive sheet has a lamination configuration of release film A/heat-expandable micro particle-containing pressure-sensitive adhesive layer/release film A.

The thickness of the heat-expandable micro particle-containing pressure-sensitive adhesive layer was 50 μm and the solvent-insoluble fraction of the heat-expandable micro particle-containing pressure-sensitive adhesive layer was 76.5% by weight.

(Single-Sided Pressure-Sensitive Sheet with Backing Film)

One of the two sheets of the release film A of the backing film-less double-sided pressure-sensitive adhesive sheet of Example 1 prepared as described above was peeled, and on the resulting exposed pressure-sensitive surface, a sheet of the backing film A was laminated to prepare a single-sided pressure-sensitive sheet with a backing film.

The single-sided pressure-sensitive sheet with a backing film has a lamination configuration of release film A/heat-expandable micro particle-containing pressure-sensitive adhesive layer/backing film A.

Example 2

Single-Sided Pressure-Sensitive Adhesive Sheet with Backing Film

One of the two sheets of the release film A of the backing film-less double-sided pressure-sensitive adhesive sheet of Example 1 prepared as described above was peeled, and on the resulting exposed pressure-sensitive surface, a sheet of the backing film B was laminated to prepare a single-sided pressure-sensitive sheet with a backing film.

The single-sided pressure-sensitive sheet with a backing film has a lamination configuration of release film A/heat-expandable micro particle-containing pressure-sensitive adhesive layer/backing film B.

(Double-Sided Pressure-Sensitive Adhesive Sheet with Backing Film)

On the surface of the backing film B of the single-sided pressure-sensitive adhesive sheet with a backing film of Example 2 prepared as described above, the backing film-less double-sided pressure-sensitive adhesive sheet of Example 1 prepared as described above, in which one of the two sheets of the release film A was peeled and a pressure-sensitive adhesive surface was exposed, was laminated to prepare a double-sided pressure-sensitive adhesive sheet with a backing film.

The double-sided pressure-sensitive adhesive sheet with a backing film has a lamination configuration of release film A/heat-expandable micro particle-containing pressure-sensitive adhesive layer/backing film B/heat-expandable micro particle-containing pressure-sensitive adhesive layer/release film A.

Example 3

By using the heat-expandable micro particle-containing pressure-sensitive adhesive composition B in place of the heat-expandable micro particle-containing pressure-sensitive adhesive composition A, a backing film-less double-sided pressure-sensitive adhesive sheet and a single-sided pressure-sensitive adhesive sheet with a backing film were prepared in the same manner as in Example 1.

The thickness of the heat-expandable micro particle-containing pressure-sensitive adhesive layer was 50 μm, and the solvent-insoluble fraction of the heat-expandable micro particle-containing pressure-sensitive adhesive layer was 72.7% by weight.

Example 4

By using the heat-expandable micro particle-containing pressure-sensitive adhesive composition C in place of the heat-expandable micro particle-containing pressure-sensitive adhesive composition A, the heat-expandable micro particle-containing pressure-sensitive adhesive composition C was applied so as for the thickness of the pressure-sensitive adhesive layer after curing to be 100 μm, and thus a backing film-less double-sided pressure-sensitive adhesive sheet and a single-sided pressure-sensitive adhesive sheet with a backing film were prepared in the same manner as in Example 1.

The thickness of the heat-expandable micro particle-containing pressure-sensitive adhesive layer was 100 μm, and the solvent-insoluble fraction of the heat-expandable micro particle-containing pressure-sensitive adhesive layer was 73.5% by weight.

Example 5

By using the heat-expandable micro particle-containing pressure-sensitive adhesive composition D in place of the heat-expandable micro particle-containing pressure-sensitive adhesive composition A, the heat-expandable micro particle-containing pressure-sensitive adhesive composition D was applied so as for the thickness of the pressure-sensitive adhesive layer after curing to be 100 μm, and thus a backing film-less double-sided pressure-sensitive adhesive sheet and a single-sided pressure-sensitive adhesive sheet with a backing film were prepared in the same manner as in Example 1.

The thickness of the heat-expandable micro particle-containing pressure-sensitive adhesive layer was 100 μm, and the solvent-insoluble fraction of the heat-expandable micro particle-containing pressure-sensitive adhesive layer was 70.2% by weight.

Example 6

By using the heat-expandable micro particle-containing pressure-sensitive adhesive composition E in place of the heat-expandable micro particle-containing pressure-sensitive adhesive composition A, the heat-expandable micro particle-containing pressure-sensitive adhesive composition E was applied so as for the thickness of the pressure-sensitive adhesive layer after curing to be 100 μm, and thus a backing film-less double-sided pressure-sensitive adhesive sheet and a single-sided pressure-sensitive adhesive sheet with a backing film were prepared in the same manner as in Example 1.

The thickness of the heat-expandable micro particle-containing pressure-sensitive adhesive layer was 100 μm, and the solvent-insoluble fraction of the heat-expandable micro particle-containing pressure-sensitive adhesive layer was 85.8% by weight.

Example 7

By using the heat-expandable micro particle-containing pressure-sensitive adhesive composition F in place of the heat-expandable micro particle-containing pressure-sensitive adhesive composition A, the heat-expandable micro particle-containing pressure-sensitive adhesive composition F was applied so as for the thickness of the pressure-sensitive adhesive layer after curing to be 100 μm, and thus a backing film-less double-sided pressure-sensitive adhesive sheet and a single-sided pressure-sensitive adhesive sheet with a backing film were prepared in the same manner as in Example 1.

The thickness of the heat-expandable micro particle-containing pressure-sensitive adhesive layer was 100 μm, and the solvent-insoluble fraction of the heat-expandable micro particle-containing pressure-sensitive adhesive layer was 60.0% by weight.

Comparative Example 1

By using the heat-expandable micro particle-containing pressure-sensitive adhesive composition G in place of the heat-expandable micro particle-containing pressure-sensitive adhesive composition A, a backing film-less double-sided pressure-sensitive adhesive sheet and a single-sided pressure-sensitive adhesive sheet with a backing film were prepared in the same manner as in Example 1.

The thickness of the heat-expandable micro particle-containing pressure-sensitive adhesive layer was 50 μm, and the solvent-insoluble fraction of the heat-expandable micro particle-containing pressure-sensitive adhesive layer was 76.6% by weight.

Comparative Example 2

By using the heat-expandable micro particle-containing pressure-sensitive adhesive composition H in place of the heat-expandable micro particle-containing pressure-sensitive adhesive composition A, a backing film-less double-sided pressure-sensitive adhesive sheet and a single-sided pressure-sensitive adhesive sheet with a backing film were prepared in the same manner as in Example 1.

The thickness of the heat-expandable micro particle-containing pressure-sensitive adhesive layer was 50 μm, and the solvent-insoluble fraction of the heat-expandable micro particle-containing pressure-sensitive adhesive layer was 84.6% by weight.

Comparative Example 3

By using the heat-expandable micro particle-containing pressure-sensitive adhesive composition T in place of the heat-expandable micro particle-containing pressure-sensitive adhesive composition A, the heat-expandable micro particle-containing pressure-sensitive adhesive composition 1 was applied so as for the thickness of the pressure-sensitive adhesive layer after curing to be 100 μm, and thus a backing film-less double-sided pressure-sensitive adhesive sheet and a single-sided pressure-sensitive adhesive sheet with a backing film were prepared in the same manner as in Example 1.

The thickness of the heat-expandable micro particle-containing pressure-sensitive adhesive layer was 100 μm, and the solvent-insoluble fraction of the heat-expandable micro particle-containing pressure-sensitive adhesive layer was 85.4% by weight.

(Measurements or Evaluations)

For each of Examples and Comparative Examples, the adhesive force to glass, the initial adhesive force, the heat debondability and the separability (reworkability) for a large area glass plate were measured or evaluated. The results thus obtained are shown in Table 3.

(Adhesive Force to Glass)

A pressure-sensitive adhesive sheet was cut to a sheet shape of 26 mm in width and 40 mm in length to prepare a specimen. By using the specimen, the adhesive force to glass was determined according to the foregoing "measurement method of the adhesive force to glass."

For each of Examples and Comparative Examples other than Example 2, the adhesive force to glass was determined by using the backing film-less double-sided pressure-sensitive adhesive sheet. For Example 2, the adhesive force to glass was determined by using the double-sided pressure-sensitive adhesive sheet with a backing film, having the backing film B (a heat shrinkable film).

(Initial Adhesive Force)

A pressure-sensitive adhesive sheet was cut to a sheet shape of 20 mm in width and 100 mm in length to prepare a specimen.

Next, in an atmosphere of 23° C., one of the release films of the specimen was peeled, and the specimen was laminated on a glass plate (trade name: "soda glass 40050," manufactured by Matsunami Glass Ind., Ltd., thickness: 0.7 mm) by pressure bonding under the condition of a single back and forth movement of a 2-kg roller. Then, the thus laminated specimen was subjected to aging at 23° C. for 30 minutes.

After the aging, in an atmosphere of 23° C., by using a tensile tester (model: "TG-1kN," manufactured by Minebea Co., Ltd.), the specimen was peeled from the glass plate under the conditions of a peeling rate of 300 mm/min and a peeling angle of 180°, and thus the 180° peeling adhesive strength (N/20 mm) was determined. And, the 180° peeling adhesive strength was defined as the initial adhesive force.

For each of Examples and Comparative Examples other than Example 2, the initial adhesive force was determined by using the backing film-less double-sided pressure-sensitive adhesive sheet. For Example 2, the initial adhesive force was determined by using the double-sided pressure-sensitive adhesive sheet with a backing film, having the backing film B (a heat shrinkable film).

(Heat Debondability)

The case where the adhesive force to glass was 12.0 N or less was evaluated as good (○), and the case where the adhesive force to glass exceeded 12.0 N was evaluated as poor (x).

When the adhesive force to glass is 12.0 N or less, the glass plate can be easily separated from the pressure-sensitive adhesive sheet, and hence the heat debondability is evaluated as good. On the other hand, when the adhesive force to glass exceeds 12.0 N, the attempt to separate the glass plate from the pressure-sensitive adhesive sheet results in the occurrence of the cracking or breakage of the glass plate, and hence the heat debondability is evaluated as poor.

Separability (Reworkability) for Large Area Glass Plate

A pressure-sensitive adhesive sheet was punched into a picture frame-like shape (see FIGS. 3 and 4) having an outer peripheral length of 170 mm, an outer peripheral width of 220 mm and a frame width of 8 mm, and thus a picture frame-like specimen (specimen 22) was obtained.

Figure 3:
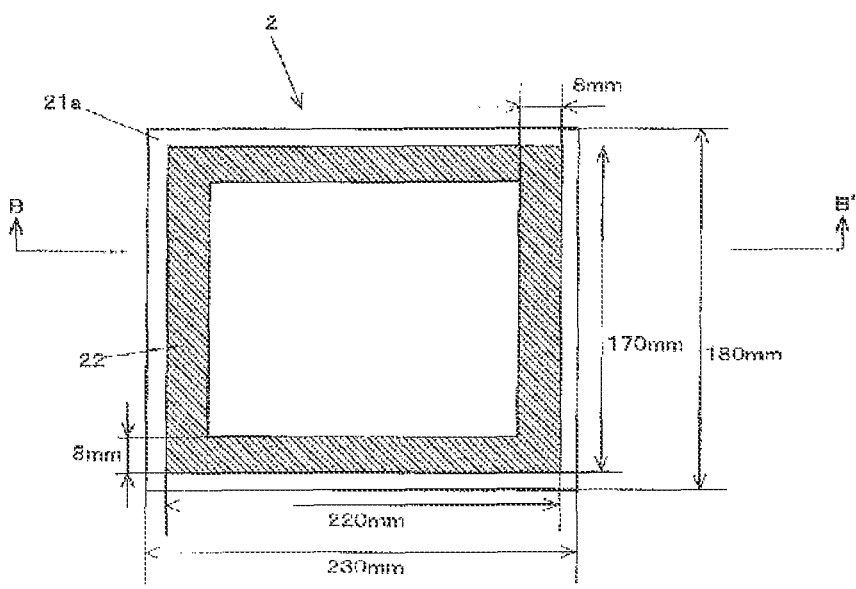
FIG. 3 is a schematic top plan view illustrating a structural object to be used at the time of evaluating the separability from a large area glass plate.
Figure 4:
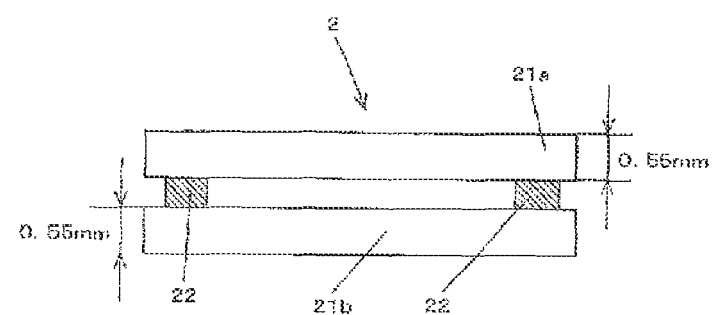
FIG. 4 is a schematic cross-sectional view (cross-sectional view along the line segment B-B') illustrating the structural object to be used at the time of evaluating the separability from a large area glass plate.

Next, from the picture frame-like specimen, one of the two release films was peeled to expose a pressure-sensitive adhesive surface, then the picture frame-like specimen was laminated with finger pressure on a large area glass plate (the large area glass plate 21b) (length: 180 mm, width: 230 mm, thickness: 0.55 mm) in such a way that the picture frame-like specimen did not run off the edge of the large area glass plate as shown in FIGS. 3 and 4. After the lamination, from the picture frame-like specimen, the other release film was peeled to expose the pressure-sensitive adhesive surface, then another large area glass plate (the large area glass plate 22b) (length: 180 mm, width: 230 mm, thickness: 0.55 mm) was laminated with finger pressure on the exposed pressure-sensitive adhesive surface as shown in FIGS. 3 and 4. Then, the thus laminated specimen was subjected to aging at 23° C. for 30 minutes.

After the aging, the structural object (the structural object 2) constituted with the two sheets of the glass plates laminated with the picture frame-like specimen was allowed to stand still in an oven set at 140° C. for 5 minutes.

After being allowed to stand still for 5 minutes, the structural object was taken out from the oven and was allowed to stand at 23° C. for 30 minutes to be cooled.

After the cooling, the two sheets of the glass plates were peeled by exerting force with hands, and the separability was evaluated on the basis of the following evaluation standards.

Evaluation Standards

Good (○): The glass plates were able to be peeled without causing cracking or breakage.

Poor (x): The exertion of the force caused the cracking or breakage of the glass plates.

TABLE 3

| | | | Heat-expandable micro particle-containing pressure-sensitive adhesive layer | | | | | | |
|---|---|---|---|---|---|---|---|---|---|
| | Backing film | Monomer composition [parts by weight] | Amount of heat-expandable micro particle [parts by weight] | Thickness [μm] | Gel fraction [%] | Adhesive force to glass [N] | Initial adhesive force [N/20 mm] | Heat debondability | separability for large area glass plate |
| Example 1 | Backing film A | 2EHA/NVC/IBXA = 70/20/10 | 30 | 50 | 76.5 | 0.58 | 6.8 | ○ | ○ |
| Example 2 | Backing film B | 2EHA/NVC/IBXA = 70/20/10 | 30 | 50 | 76.5 | 0.05 | 11.3 | ○ | ○ |
| Example 3 | Backing film A | 2EHA/DMAA/IBXA = 60/30/10 | 20 | 50 | 72.7 | 10.0 | 7.5 | ○ | ○ |
| Example 4 | Backing film A | 2EHA/NVP = 80/20 | 30 | 100 | 73.5 | 0.48 | 8.8 | ○ | ○ |
| Example 5 | Backing film A | 2EHA/NVC = 80/20 | 30 | 100 | 70.2 | 0.30 | 10.8 | ○ | ○ |
| Example 6 | Backing film A | 2EHA/IBXA = 80/20 | 30 | 100 | 85.8 | 0.03 | 4.5 | ○ | ○ |
| Example 7 | Backing film A | BA/DMAA = 80/20 | 30 | 100 | 60.0 | 0.22 | 5.0 | ○ | ○ |
| Comparative Example 1 | Backing film A | 2EHA/NVC/IBXA = 70/20/10 | Not used | 50 | 76.6 | 16.5 | 12.4 | x | x |
| Comparative Example 2 | Backing film A | 2EHA/AA = 85/25 | 20 | 50 | 84.6 | 20.5 | 0.3 | x | x |
| Comparative Example 3 | Backing film A | 2EHA/AA = 90/10 | 30 | 100 | 85.4 | 19.0 | 10.8 | x | x |

REFERENCE SIGNS LIST

1 Laminate
11 Glass plate A
12 Pressure-sensitive adhesive sheet
121a End A (Adhesion end A)
121b End B (Adhesion end B)
13 Glass plate B 131 Pulling portion
a Pulling direction
2 Structural object
21a Large area glass plate
21b Large area glass plate
22 Specimen

The invention claimed is:

1. A pressure-sensitive adhesive sheet for glass plates comprising a pressure-sensitive adhesive layer including an acrylic polymer,
wherein the content of the acrylic polymer in the pressure-sensitive adhesive layer is 30% by weight or more in relation to the total amount (100% by weight) of the pressure-sensitive adhesive layer;
the acrylic polymer substantially comprises no acidic functional group;
the solvent-insoluble fraction of the pressure-sensitive adhesive layer is 50% or more; and
the adhesive force to glass as determined by the following method is 12.0 N or less;
by using a pressure-sensitive adhesive sheet (width: 26 mm, length: 40 mm), a glass plate A (width: 50 mm, length: 100 mm, thickness: 0.7 mm) and a glass plate B (width: 26 mm, length: 760 mm, thickness: 1.0 mm) are laminated on each other to yield a laminate in such a way that:
the size of the adhesion portion is 26 mm in width and 40 mm in length; the lengthwise direction of the pressure-sensitive adhesive sheet, the lengthwise direction of the glass plate A and the lengthwise direction of the glass plate B are the same each other; and one lengthwise end A (adhesion end A) and one lengthwise end of the glass plate B are superposed to each other;
the resulting laminate is allowed to stand in an atmosphere of 23° C. for 30 minutes, and then autoclave treated under the conditions of a pressure of 5 atm, a temperature of 50° C. and a period of time of 15 minutes; then, the laminate after the autoclave treatment is heat treated under the conditions of a temperature of 145° C. and a period of time of 4 minutes; then, the laminate after the heat treatment is allowed to stand in an atmosphere of 23° C. for 30 minutes, successively the portion of the glass plate B located at a distance displaced by 20 mm in the lengthwise direction from the end B (the adhesion end B) opposite to the end A in the pressure-sensitive adhesive sheet and not brought into contact with the pressure-sensitive adhesive sheet is pulled at a tensile rate of 300 mm/min in the thickness direction of the laminate toward the side of the glass plate B, and the force (N) required to peel the glass plate B is determined; the force required for the peeling is defined as the adhesive force to glass.

2. The pressure-sensitive adhesive sheet for glass plates according to claim 1, wherein the initial adhesive force thereof as determined by the following measurement method is 3.0 N/20 mm or more;
in an atmosphere of 23° C., the pressure-sensitive adhesive sheet is laminated to a glass plate by pressing under the condition of a single back and forth movement of a 2-kg roller and is allowed to stand in the atmosphere of 23° C. for 30 minutes; after being allowed to stand, the pressure-sensitive adhesive sheet is peeled from the glass plate under the conditions of a peeling rate of 300 mm/min and a peeling direction of 180° to determine the 180° peeling adhesive strength (N/20 mm); the resulting 180° peeling adhesive strength is defined as the initial adhesive force.

3. The pressure-sensitive adhesive sheet for glass plates according to claim 1, wherein the pressure-sensitive adhesive layer is formed of a pressure-sensitive adhesive composition comprising a monomer mixture including the following (a1), and additionally at least one monomer selected from the group consisting of the following (a2) and (a3), or a partially polymerized substance of the monomer mixture, and including a heat-expandable micro particle, wherein the contents of (a1), (a2) and (a3), in the total amount (100% by weight) of (a1), (a2) and (a3), are 40 to 90% by weight, 0 to 40% by weight and 0 to 30% by weight, respectively:
(a1): An alkyl(meth)acrylate having an alkyl group having 4 to 12 carbon atoms, and giving a glass transition temperature of lower than 0° C. when polymerized into a homopolymer
(a2): A monomer having in the molecule thereof at least a nitrogen atom and an ethylenically unsaturated bond
(a3): A monomer (exclusive of the (a2)) giving a glass transition temperature of 0° C. or higher when polymerized into a homopolymer and having an ethylenically unsaturated bond in the molecule thereof.

4. The pressure-sensitive adhesive sheet for glass plates according to claim 3, wherein the content of the heat-expandable micro particles in the pressure-sensitive adhesive composition is 10 to 200 parts by weight in relation to 100 parts by weight of the monomer mixture.

5. The pressure-sensitive adhesive sheet for glass plates according to claim 3, wherein the (a2) is at least a monomer selected from the group consisting of dimethyl acrylamide, N-vinylpyrrolidone and N-vinyl caprolactam.

6. The pressure-sensitive adhesive sheet for glass plates according to claim 3, wherein the (a3) is a (meth)acrylate monomer which gives a glass transition temperature of 0° C. or higher when polymerized into a homopolymer and has a structure in which a (meth)acryloyloxy group and a tertiary carbon atom are bonded to each other, or a (meth)acrylate monomer which gives a glass transition temperature of 0° C. or higher when polymerized into a homopolymer and has a structure in which a (meth)acryloyloxy group and a carbon atom forming a ring of a monocyclic or polycyclic alicyclic hydrocarbon are bonded to each other.

7. The pressure-sensitive adhesive sheet for glass plates according to claim 3, wherein the (a3) is at least a monomer selected from the group consisting of tert-butyl(meth)acrylate, cyclohexyl(meth)acrylate, isobornyl(meth)acrylate, 1,4-cyclohexanedimethanol mono(meth)acrylate and dicyclopentanyl(meth)acrylate.

8. The pressure-sensitive adhesive sheet for glass plates according to claim 1, comprising the pressure-sensitive adhesive layer on at least one side of a backing film.

9. The pressure-sensitive adhesive sheet for glass plates according to claim 8, wherein the backing film is a heat shrink film to shrink at a temperature in a range from 70 to 180° C. by 5% or more.

* * * * *